United States Patent
Mueller et al.

(10) Patent No.: US 12,367,539 B2
(45) Date of Patent: *Jul. 22, 2025

(54) SYSTEMS AND METHODS FOR GENERATING FLIGHT PLANS USED BY A RIDE SHARING NETWORK

(71) Applicant: Joby Aero, Inc., Santa Cruz, CA (US)

(72) Inventors: Eric Richard Mueller, San Francisco, CA (US); Bogu Wei, San Jose, CA (US); Igor Dolgov, San Mateo, CA (US); Raphael Max Lurie, Brooklyn, NY (US); Adam Warmoth, Los Angeles, CA (US); Kellen Christopher Mollahan, Summit, NJ (US); Karl Weston Schulz, Long Island City, NY (US)

(73) Assignee: Joby Aero, Inc., Santa Cruz, CA (US)

( * ) Notice: Subject to any disclaimer, the term of this patent is extended or adjusted under 35 U.S.C. 154(b) by 9 days.

This patent is subject to a terminal disclaimer.

(21) Appl. No.: 18/173,863

(22) Filed: Feb. 24, 2023

(65) Prior Publication Data
US 2023/0351540 A1    Nov. 2, 2023

Related U.S. Application Data

(63) Continuation of application No. 17/212,413, filed on Mar. 25, 2021, now Pat. No. 11,615,501.
(Continued)

(51) Int. Cl.
*G06Q 10/00* (2023.01)
*G06Q 10/0631* (2023.01)
(Continued)

(52) U.S. Cl.
CPC ....... *G06Q 50/40* (2024.01); *G06Q 10/06312* (2013.01); *G06Q 30/0202* (2013.01); *G06Q 50/47* (2024.01)

(58) Field of Classification Search
CPC ............ G06Q 50/40; G06Q 10/06312; G06Q 30/0202
See application file for complete search history.

(56) References Cited

U.S. PATENT DOCUMENTS

| 3,035,789 A | 5/1962 | Young |
| 4,022,405 A | 5/1977 | Peterson |

(Continued)

FOREIGN PATENT DOCUMENTS

| EP | 0945841 A1 | 9/1999 |
| EP | 2698749 A1 | 2/2014 |

(Continued)

OTHER PUBLICATIONS

R. Giesecke, T. Surakka and M. Hakonen, "Conceptualising Mobility as a Service," 2016 Eleventh International Conference on Ecological Vehicles and Renewable Energies (EVER), Monte Carlo, Monaco, 2016, pp. 1-11, doi: 10.1109/EVER.2016.7476443. (Year: 2016).*

(Continued)

*Primary Examiner* — Matheus Ribeiro Stivaletti
(74) *Attorney, Agent, or Firm* — Dority & Manning, P.A.

(57) ABSTRACT

The present disclosure provides systems and methods for systems and methods for generating potential flight plans to be used by a ride sharing network, including dynamic and/or automated changes to flight plans that have been engaged with passengers based on real-time information. In particular, the systems and methods of the present disclosure can operate to generate a fleet-level set of potential flight plans which comply with one or more constraints for a fleet of aircraft. The potential flight plans can be exposed into and used by a ride sharing network to provide transportation to users.

18 Claims, 6 Drawing Sheets

Related U.S. Application Data

(60) Provisional application No. 62/994,320, filed on Mar. 25, 2020.

(51) Int. Cl.
*G06Q 30/00* (2023.01)
*G06Q 30/0202* (2023.01)
*G06Q 50/00* (2024.01)
*G06Q 50/40* (2024.01)
*G06Q 50/47* (2024.01)

(56) References Cited

U.S. PATENT DOCUMENTS

| | | |
|---|---|---|
| 5,823,468 A | 10/1998 | Bothe |
| 5,839,691 A | 11/1998 | Lariviere |
| 5,842,667 A | 12/1998 | Jones |
| 6,343,127 B1 | 1/2002 | Billoud |
| 6,892,980 B2 | 5/2005 | Kawai |
| 8,016,226 B1 | 9/2011 | Wood |
| 8,020,804 B2 | 9/2011 | Yoeli |
| 8,311,686 B2 | 11/2012 | Herkes et al. |
| 8,733,690 B2 | 5/2014 | Bevirt et al. |
| 8,737,634 B2 | 5/2014 | Brown et al. |
| 8,849,479 B2 | 9/2014 | Walter |
| 9,205,930 B2 | 12/2015 | Yanagawa |
| 9,387,928 B1 | 7/2016 | Gentry et al. |
| 9,415,870 B1 | 8/2016 | Beckman et al. |
| 9,422,055 B1 | 8/2016 | Beckman et al. |
| 9,435,661 B2 | 9/2016 | Brenner et al. |
| 9,442,496 B1 | 9/2016 | Beckman et al. |
| 9,550,561 B1 | 1/2017 | Beckman et al. |
| 9,663,237 B2 | 5/2017 | Senkel et al. |
| 9,694,911 B2 | 7/2017 | Bevirt et al. |
| 9,771,157 B2 | 9/2017 | Gagne et al. |
| 9,786,961 B2 | 10/2017 | Dyer et al. |
| 9,802,702 B1 | 10/2017 | Beckman et al. |
| 9,816,529 B2 | 11/2017 | Grissom et al. |
| 9,838,436 B2 | 12/2017 | Michaels |
| 10,140,873 B2 | 11/2018 | Adler et al. |
| 10,152,894 B2 | 12/2018 | Adler et al. |
| 10,216,190 B2 | 2/2019 | Bostick et al. |
| 10,249,200 B1 | 4/2019 | Grenier et al. |
| 10,304,344 B2 | 5/2019 | Moravek et al. |
| 10,330,482 B2 | 6/2019 | Chen et al. |
| 10,593,215 B2 | 3/2020 | Villa |
| 10,593,217 B2 | 3/2020 | Shannon |
| 10,752,365 B2 | 8/2020 | Galzin |
| 10,759,537 B2 | 9/2020 | Moore et al. |
| 10,768,201 B2 | 9/2020 | Luo et al. |
| 10,832,581 B2 | 11/2020 | Westervelt et al. |
| 10,836,470 B2 | 11/2020 | Liu et al. |
| 10,913,528 B1 | 2/2021 | Moore et al. |
| 10,948,910 B2 | 3/2021 | Taveira et al. |
| 10,960,785 B2 | 3/2021 | Villanueva et al. |
| 11,130,566 B2 | 9/2021 | Mikic et al. |
| 11,145,211 B2 | 10/2021 | Goel et al. |
| 11,238,745 B2 | 2/2022 | Villa et al. |
| 11,295,622 B2 | 4/2022 | Goel et al. |
| 2010/0079342 A1 | 4/2010 | Smith et al. |
| 2014/0156109 A1* | 6/2014 | Estkowski ............ G05D 1/106 701/2 |
| 2014/0179535 A1 | 6/2014 | Stückl et al. |
| 2016/0093217 A1 | 3/2016 | Hale et al. |
| 2016/0311529 A1 | 10/2016 | Brotherton-Ratcliffe et al. |
| 2017/0197710 A1 | 7/2017 | Ma |
| 2017/0357914 A1 | 12/2017 | Tulabandhula et al. |
| 2018/0018887 A1 | 1/2018 | Sharma et al. |
| 2018/0053425 A1 | 2/2018 | Adler et al. |
| 2018/0091605 A1 | 3/2018 | Nickels et al. |
| 2018/0101802 A1* | 4/2018 | Fox ................ G06Q 10/06312 |
| 2018/0216988 A1 | 8/2018 | Nance |
| 2018/0308366 A1 | 10/2018 | Goel et al. |
| 2018/0354636 A1 | 12/2018 | Darnell et al. |
| 2019/0034838 A1 | 1/2019 | Canis et al. |
| 2019/0146508 A1 | 5/2019 | Dean et al. |
| 2019/0221127 A1* | 7/2019 | Shannon ............. G08G 5/0026 |
| 2019/0316849 A1 | 10/2019 | Abrego et al. |
| 2019/0325757 A1 | 10/2019 | Goel et al. |
| 2020/0103922 A1 | 4/2020 | Nonami et al. |
| 2020/0182637 A1 | 6/2020 | Kumar et al. |
| 2020/0300645 A1* | 9/2020 | Schirano ............ G01C 21/3676 |
| 2020/0380629 A1 | 12/2020 | Monteil et al. |
| 2020/0388166 A1 | 12/2020 | Rostamzadeh et al. |
| 2021/0072033 A1* | 3/2021 | Husain ................ H04W 12/106 |
| 2021/0192962 A1 | 6/2021 | Bristow et al. |

FOREIGN PATENT DOCUMENTS

| | | |
|---|---|---|
| EP | 3499634 A1 | 6/2019 |
| JP | 2010095246 A | 4/2010 |
| JP | 2013086795 A | 5/2013 |
| JP | 2017139746 A | 8/2017 |
| WO | WO 2018023556 A1 | 2/2018 |
| WO | WO 2019089677 A1 | 5/2019 |
| WO | WO 2020252024 A1 | 12/2020 |

OTHER PUBLICATIONS

Bennaceur et al., "Passenger-centric urban air mobility: Fairness trade-offs and operational efficiency", Transportation Research: Emerging Technologies, 2021, 29 pages.

Jong, "Optimizing cost effectiveness and flexibility of air taxis: A case study for optimization of air taxi operations", University of Twente, Master's thesis, 2007, 62 pages.

Miao et al., "Data-driven robust taxi dispatch under demand uncertainties", IEEE Transactions on Control Systems Technology 27, No. 1, 2017, 16 pages.

Miao et al., "Taxi dispatch with real-time sensing data in metropolitan areas: A receding horizon control approach", In Proceedings of the ACM/IEEE Sixth International Conference on Cyber-Physical Systems, 2015, 15 pages.

Uber, "Fast-forwarding to a future of on-demand urban air transportation", 2016, 99 pages.

International Search Report and Written Opinion for Application No. PCT/US2021/024158, mailed Jul. 2, 2021, 15 pages.

* cited by examiner

SYSTEMS AND METHODS FOR GENERATING FLIGHT PLANS USED BY A RIDE SHARING NETWORK

PRIORITY CLAIM

The present application is a continuation of U.S. Nonprovisional application Ser. No. 17/212,413 filed Mar. 25, 2021, now issued as U.S. Pat. No. 11,615,501, which claims priority to and the benefit of United States Provisional Patent Application No. 62/994,320, filed Mar. 25, 2020. Applicant claims priority to and the benefit of each of such applications and incorporates all such applications herein by reference in its entirety.

FIELD

The present disclosure relates generally to facilitating ride sharing of aircraft flights. More particularly, the present disclosure relates to systems and methods for planning flights to be used by a ride sharing network, including dynamic changes to flight plans based on real-time information.

BACKGROUND

Transportation services exist which enable individual users to request transportation on demand. For example, transportation services currently exist which enable drivers of ground-based vehicles (e.g., "cars") to provide transportation services for potential passengers, as well as to deliver packages, goods, and/or prepared foods.

However, as urban areas become increasingly dense, ground infrastructure such as roadways will become increasingly constrained and congested and, as a result, ground-based transportation may not suitably serve the transportation needs of a significant number of users.

SUMMARY

Aspects and advantages of embodiments of the present disclosure will be set forth in part in the following description, or can be learned from the description, or can be learned through practice of the embodiments.

One example aspect of the present disclosure is directed to a computing system configured to generate flight plans for a ride sharing network. The computing system includes one or more processors and one or more non-transitory computer-readable media that collectively store instructions that, when executed by the one or more processors, cause the computing system to perform operations. The operations include receiving input data descriptive of a fleet of aircraft, one or more constraints, and a flight planning period. The operations include generating a set of potential flight plans for the fleet of aircraft and the flight planning period based at least in part on the input data. The operations include exposing the set of potential flight plans to the ride sharing network. The operations include receiving, from the ride sharing network, one or more additions of one or more passengers to one or more of the potential flight plans to generate one or more engaged flight plans.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

DETAILED DESCRIPTION

Figure 1:
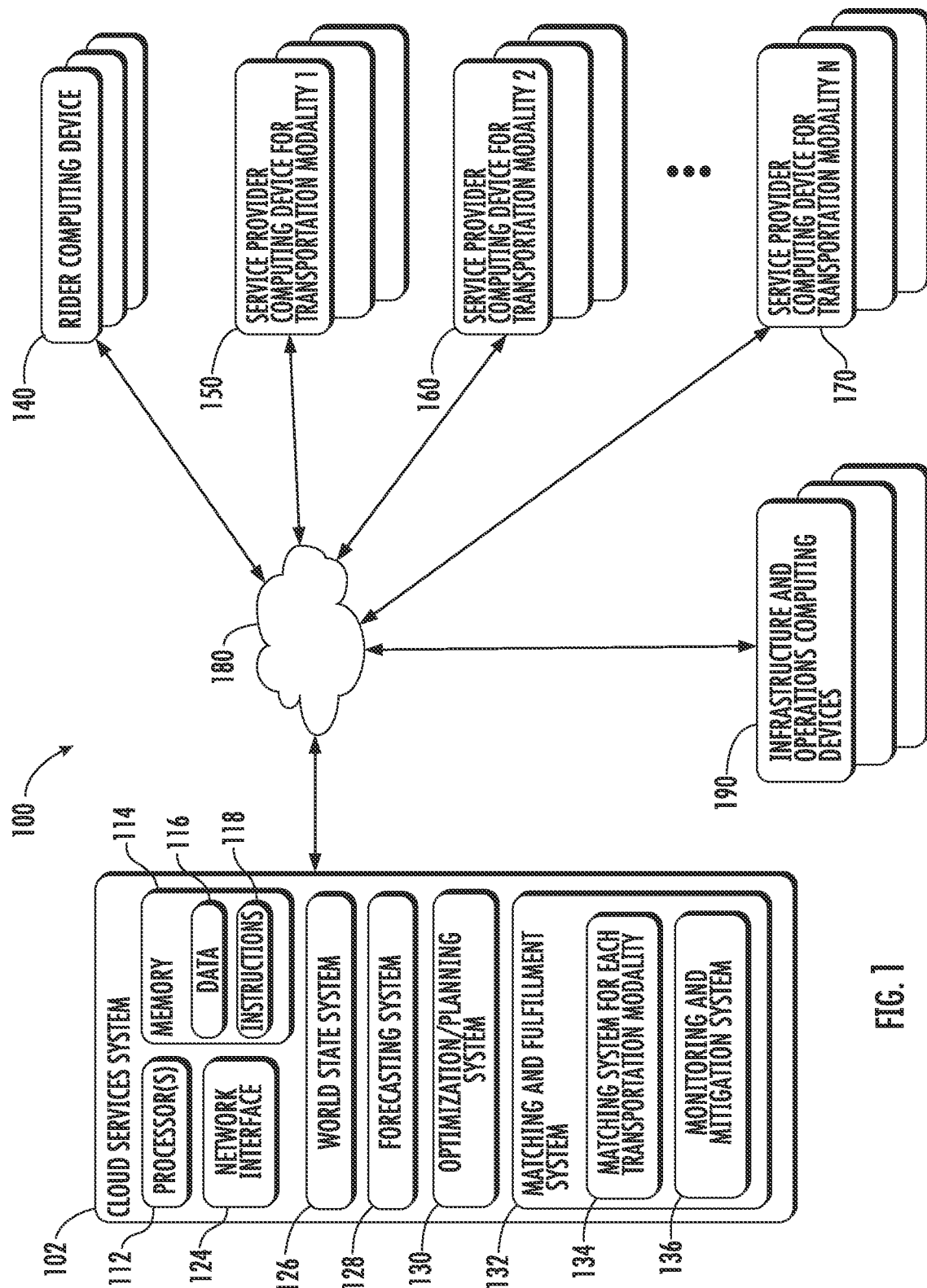
FIG. 1 depicts a block diagram of an example computing system according to example embodiments of the present disclosure.

Example aspects of the present disclosure are directed to systems and methods for generating potential flight plans to be used by a ride sharing network, including, in some implementations, dynamic and/or automated changes to flight plans based on real-time information. In particular, the systems and methods of the present disclosure can operate to generate a fleet-level set of potential flight plans which comply with one or more constraints for a fleet of aircraft. The potential flight plans can be introduced into and used by a ride sharing network to provide transportation service to users. For example, the ride sharing network can add passengers to a potential flight plan to engage the flight plan (e.g., bring the flight plan into operation). The flights associated with engaged flight plans may be provided as a stand-alone transportation service or may be a portion of larger, multi-leg transportation service itinerary which utilizes multiple modalities of transportation such as a mix of transportation via car and transportation via aircraft. In addition, the systems and methods of the present disclosure provide manual and/or automatic tools for flight plan adjustment to, for example, handle and mitigate delays or other real-time impacts that cause deviation of the fleet of aircraft from the set of flight plans.

More particularly, a flight planning system implemented by one or more computing devices can receive a set of input data that describes a fleet of aircraft, one or more flight planning constraints, and a flight planning period. The input data can be provided by a user and/or can automatically ingested (e.g., periodically such as daily). For example, in some implementations, disparate aircraft owners/operators can interact with a computing system (e.g., application implemented thereby) to provide information on the availability of their aircraft for participation in the ride sharing network. The provided information can then be accessed by the flight planning system. In other implementations, information about the fleet of available aircraft comes from a single centralized source that oversees all aircraft operations.

The fleet of aircraft can include any number of aircraft of the same or different models owned and/or operated by one or more different aerial operators. Example aircraft that can be included in the fleet include helicopters or other vertical take-off and landing aircraft (VTOL) such as electric vertical take-off and landing aircraft (eVTOL). In some implementations, the fleet of aircraft can include aircraft that are capable of varying levels of autonomous flight/motion, including, non-autonomous aircraft, semi-autonomous aircraft, and full-autonomous aircraft. Each aircraft can be owned, maintained, and/or operated by one or more different aerial vehicle operators. By way of example, an aerial vehicle operator can include any entity with operational control (e.g., ownership, license, etc.) over one or more aerial vehicles. Each aerial vehicle operator can make the one or more aerial vehicles available during the flight planning period.

The flight planning period can define an overall start and end date and time for which the flight planning system should generate potential flight plans for the fleet of aircraft. Example flight planning periods include spans of 3 hours, 24 hours, a week, etc. The flight planning period can be continuous or include disjointed periods of time.

The constraints described by the set of input data can include any number of different constraints associated with each aircraft such as, as examples: a respective starting location for each aircraft; a respective ending location for each aircraft; respective times at which each aircraft is available or unavailable; respective starting fuel or charge levels for each aircraft; respective capabilities or attributes of each aircraft such as number of passenger seats available, maximum consecutive operational time, maximum or minimum flight range, maximum or minimum flight altitude, noise levels associated with operation of the aircraft, etc.

The constraints described by the set of input data can also describe a fixed infrastructure that the fleet of aircraft must utilize. More particularly, in some implementations, the aircraft can operate according to or within a fixed infrastructure in which the ability of passengers to embark and disembark the aircraft is constrained to a defined set of transportation nodes. As one example, aircraft can be constrained to load and unload passengers only at a defined set of physical take-off and/or landing areas which may, in some instances, be referred to as skyports. To provide an example, a large urban area may have dozens of transportation nodes located at various locations within the urban area. Each transportation node can include one or more take-off and/or landing pads and/or other infrastructure to enable passengers to safely embark or disembark from aircraft. Transportation nodes can also include charging equipment, refueling equipment, and/or other infrastructure for enabling aircraft operation. The take-off and/or landing pads of the transportation nodes can be located at ground-level and/or elevated from ground-level (e.g., atop a building). Thus, the input data to the flight planning system can also provide various constraints associated with each respective transportation node such as, as examples: location; the type of aircraft that are able to take-off/land at the transportation node; the number of take-off and/or landing pads at the transportation node; the number of fueling or charging structures at the transportation node; the minimum turn-around time for an aircraft to land and then take-off from a transportation node; how frequently aircraft can arrive and depart the transportation node (e.g., throughput); airspace approach requirements; and/or other descriptors of the different transportation nodes.

In some implementations, the constraints described by the set of input data can also describe an availability of other resources such as particular aircraft operators ("pilots"), operations personnel, physical resources available at a transportation node (e.g., machines for secure passenger intake, fuel, maintenance capabilities), etc. In some implementations, particular pilots can be linked with particular aircraft and treated as a single resource while, in other implementations, they can be treated as separate resources.

In some implementations, the input data to the flight planning system can include other additional data such as forecasted demand, supply, or weather data. For instance, forecasted demand data can be provided as an input to the flight planning system. The forecasted demand data can describe a forecasted demand for flight transportation at various times and locations over the flight planning period. The data can describe forecasted origins and destinations for the demand or may simply forecast the origin of the demand.

The forecasted demand data can be based, at least in part, on the ride sharing network. The ride sharing network, for example, can include a multi-modal ride sharing network configured to provide a transportation service (e.g., to be performed by aircraft, ground vehicle, etc.) for a plurality of different users of the network. For instance, the ride sharing network can receive a request for transportation between two locations (e.g., an origin location and a desired location), determine one or more optimal modalities (e.g., aircraft, ground vehicles, etc.) for facilitating the transportation, and assign a service provider associated with the one or more optimal modalities to provide the transportation. The ride sharing network can determine forecasted demand data by leveraging the number of real time requests and/or historical data indicative of the number of requests received from the plurality of different users of the network. In this manner, the forecasted demand data can be determined based, at least in part, on the ride sharing network. By way of example, the forecasted demand data can include the historical and/or real time requests from passengers of the ride sharing network and/or data determined based, at least in part, on the historical and/or real time requests from passengers of the ride sharing network and provided to the flight planning system. In this manner, the set of potential flights generated by the flight planning system can shift throughout an operational time period based, at least in part, on information from the ride sharing network.

As another example, forecasted supply data can be provided as an input to the flight planning system. The forecasted supply data can describe the forecasted supply of ground-based transportation providers at different respective times and transportation locations over the flight planning period. The forecasted supply data can be based, at least in part, on the ride sharing network. For instance, the ride sharing network can include a plurality of service providers (e.g., drivers, aircraft operators, etc.) and/or be associated with a plurality of ride sharing assets (e.g., vehicles, etc.). The forecasted supply data can identify a number of service providers and/or assets that are available (e.g., opted in, etc.) for providing a transportation service at a plurality of different times and/or locations over the flight planning period. In this manner, the forecasted supply data can be determined based, at least in part, on the ride sharing network. By way of example, the forecasted supply data can include historical and/or real time information identifying the availability of the number of service providers and/or assets of the ride sharing network and/or data determined based, at least in part, on the historical and/or real time availability of the number of service providers and/or assets of the ride sharing network and provided to the flight planning system. In some implementations, the set of potential flights generated by the flight planning system can be provided as forecasted supply data for the ride sharing network. In such a case, the ride sharing network can prompt (e.g., by encouraging commitments from drivers, operators, and/or asset owners) the availability of the number of service providers and/or assets of the ride sharing network based, at least in part, on the set of potential flights.

As yet other examples, the additional data can include forecasted weather data that can be provided as input data to the flight planning system, available flight paths between infrastructure nodes, airspace availability throughout the planning period, and/or other aeronautical information.

According to an aspect of the present disclosure, in response to the input data, the flight planning system can generate a set of potential flight plans for the fleet of aircraft over the flight planning period. Each potential flight plan can include various types of information such as, as examples: the identity of the aircraft, the identity of the pilot (if needed), the origin location, the destination location, a rough indication of flight path, an estimated time of departure, an estimated time of arrival, and/or various other information regarding the potential operation of an aircraft.

More particularly, the flight planning system can generate the set of potential flight plans that maximize satisfaction of a combination of one or more objectives while also adhering to all of the constraints (e.g., not violating any of the constraints). As examples, the objectives considered by the flight planning system can include maximizing the number of potential flights generated, maximizing the ratio of potential flight plans that become engaged, maximizing the number of engaged flights that operate at maximum passenger capacity, maximizing the number of passengers to whom a flight is delivered, maximizing the number of passengers that arrive at their destination on time, minimizing the cumulative time period that passengers are delayed past their desired arrival time, and/or various other objectives. In some implementations, the flight planning system can use a fleet-level objective function that balances (e.g., using a set of weights) some or all of the different objectives described above. The set of weights can be manually tuned and/or automatically tuned (e.g., learned).

The flight planning system can perform one or more of various different algorithms to generate the set of potential flight plans. For example, in some implementations, the flight planning system can iteratively analyze the fleet of aircraft on an aircraft-by-aircraft basis, generating an optimal set of potential flight plans for each aircraft in turn. For example, the optimal set of potential flight plans for an aircraft can be generated by optimizing, for such aircraft, an aircraft-level objective function that balances (e.g., using a set of weights) a combination of any of the objectives described above. The set of weights in the aircraft-level objective function can be manually tuned and/or automatically tuned (e.g., learned). In some implementations, the aircraft-level objective function and the fleet-level objective function can be the same function and have the same weights. In some implementations, the fleet-level objective function can equal a sum of the aircraft-level objective function as respectively applied to all aircraft in the fleet.

In particular, in one example, the flight planning system can generate a set of flight plans for a particular aircraft by starting at the beginning of the flight planning period and sequentially generating/adding flight plans for the aircraft until the end of the flight planning period is reached. As one example, at each instance in which the flight planning system attempts to generate a new flight plan for an aircraft, the flight planning system can generate a plurality of candidate flight plans, score each candidate flight plan according to the aircraft-level objective function, and then select and add the highest scoring flight plan for the aircraft.

As described above, the aircraft-level objective function can balance any number of different objectives, including, as examples, various objectives which are a function of demand for the generated flight plan (e.g., total number of passengers serviced, total number of engaged flights, total number of flights that have all available seats filled, etc.). To evaluate such an objective function that includes objectives that are a function of demand, the flight planning system can query a demand model to obtain forecasted demand and/or supply information that can be used to evaluate such objectives. In another example, the aircraft-level objective function may focus (e.g., include as the sole objective) on maximizing the total number of flight plans generated.

In some implementations, the objective function can evaluate a set of flight plans based, at least in part, on an ultimate journey for a plurality of potential passengers. For example, an objective can include a function to reduce the total travel time for the plurality of passengers. By way of example, the demand data (e.g., received and/or based on the ride share service) can include an anticipated demand for transportation services. At times, the transportation services can include multi-modal transportation services. In such a case, an aerial flight leg such as one of the set of potential flight plans can include one of multiple destinations for a passenger before the passenger reaches a final destination. The objective function can evaluate the set of flight plans based, at least in part, on the total estimated travel time for the plurality of passengers. For example, the flight planning system can identify infrastructural, traffic, weather, and/or other factors that can have an impact on a subsequent ground transportation leg and optimize the set of potential flight plans to lower the total estimated travel time for users of the ride sharing network.

By way of example, the flight planning system can take ground-based transportation information into account when generating the set of flight plans. For example, forecasted last mile supply availability can be used as an input to the aircraft-level objective function to reward (e.g., increase objective score for) flights that deliver passengers to destinations which have a robust supply of ground-based transportation services and to penalize (e.g., decrease objective score for) flights that deliver passengers to destinations which do not have a robust supply of ground-based transportation services. Similarly, forecasted first mile supply availability can be used as an input to the aircraft-level objective function to reward (e.g., increase objective score for) flights that collect passengers from departure nodes which have a robust supply of ground-based transportation services and to penalize (e.g., decrease objective score for) flights that collect passengers from departure nodes which do not have a robust supply of ground-based transportation services. In other implementations, such information regarding supply of transportation services according to other modalities can be assumed to be included in the forecasted demand data.

The flight planning system (e.g., the objective function, etc.) can evaluate the set of flight plans based, at least in part, on how close the set of potential flight plans can transport potential passengers (e.g., expected based on forecasted demand data, etc.) to an expected ultimate destination. For example, the forecasted demand data can include an expected ultimate destination for each of a plurality of anticipated passengers. The flight planning system can generate the set of potential flight plans in order to facilitate the transport of the plurality of anticipated passengers to a location (e.g., a transport node) closest to the expected ultimate destination.

In some implementations, the closest location (e.g., transport node) to the expected ultimate destination may not be the most efficient and/or timely route for transporting the plurality of anticipated passengers. For example, a subsequent ground transportation from the closest location can be affected by traffic and/or other roadway delays. Moreover, in some implementations, the flight plan to the closest location can be affected by weather or other airspace delays. In such a case, the flight planning system (e.g., the objective function, etc.) can generate/evaluate the set of flight plans in order to facilitate the transport of the plurality of anticipated passengers to a location (e.g., a transport node) closest, temporally, to the expected ultimate destination such that factors affecting the subsequent transportation to an ultimate destination are accounted for.

In some implementations, the flight planning system can perform a tiered approach to generating flight plans. In particular, the flight planning period can be divided into a number of different time periods and each time period can be assigned to one of a plurality of priority tiers. There can be any number of priority tiers including, for example, two tiers. More particularly, the tiered approach recognizes that certain time periods through the day or week may be higher priority due to an increased level of demand by passengers. As one example, time periods corresponding to "rush hours" or common commuting times can be considered higher priority than other time periods. As another example, time periods which include popular events (e.g., sporting events, music festivals, and/or the like) occur can be recognized as higher priority time periods. In yet another example, the time periods can be sorted into the different priority tiers based on the forecasted demand data.

In the multi-tiered approach, the flight planning system can iteratively generate flight plans for the time periods in each priority tier, starting with the highest priority tier first. Thus, after determining flight plans for the time periods of the highest priority tier, the flight planning system can then determine flight plans for the time periods of the next-highest priority tier. In particular, each tier of time periods can use the generated flight plans for the previous tier(s) as constraints for the scheduling process. For example, if the generated flight plans for the time period of 4 pm to 7 pm require that a given aircraft start at a particular transportation node and with a particular fuel/charge level, then, when generating flight plans for the time period of 1 pm to 4 pm, the flight planning system can treat as constraints the fact that the aircraft needs to end the 1-4 pm time period at the particular transportation node and with the particular fuel/charge level. In such fashion, flight plans can be optimized specifically for the highest priority time periods in which, for example, the largest number of passengers need to be serviced.

In addition, in some implementations, the flight planning algorithms can include a greedy refueling component. The greedy refueling component can greedily assign an aircraft to participate in refueling and/or recharging whenever the aircraft is not in-flight (e.g., for more than a minimum amount of time) and refueling/recharging infrastructure is available at the aircraft's current location. The greedy refueling component can be applied after generation of the flight plans or can be used as part of the generation process itself. In such fashion, the use of refueling/recharging infrastructure can be optimized.

In some implementations, the flight planning system can perform or participate in an iterative learning process for weights of planning objective function(s). For example, an initial set of weights for the objective function(s) can be manually tuned. The flight planning system can operate with the initial set of weights to generate any number of flight plans for any number of flight planning periods. Outcomes associated with the generated flight plans can be observed and measured according to various metrics. The set of weights can be retuned (e.g., automatically and/or manually) based on the observed outcomes. For example, various learning techniques such as gradient descent techniques can be applied to learn the set of weights. For example, gradient descent techniques can be applied to the weights of fleet-level objective function or the aircraft-level objective function. More generally, the flight planning system can collect any data that describes the outcomes of certain manually-controlled settings, actions, weightings, decisions, and/or the like and can apply machine learning techniques to such data to learn updated or optimized versions of such settings, actions, weightings, decisions, and/or the like.

In this manner, the flight planning system can automatically generate the set of potential flight plans for a fleet of aircraft owned and/or operated by one or more different aerial operators. In some implementations, each flight plan can be approved by a respective aerial vehicle operator. For example, each aerial vehicle operator can be associated with a preapproval rule set. The preapproval ruleset, for example, can outline one or more acceptable flight plans (e.g., from/to/between one or more approved locations, within an approved time period, etc.) for aerial vehicles under the operational control of the respective aerial vehicle operator. In some implementations, the set of potential flight plans can only include approved flight plans. In addition, or alternatively, the set of potential flight plans can include unapproved flight plans. In such a case, the unapproved flight plans can be provided (e.g., escalated) to the respective aerial vehicle operator for manual approval. The flight planning system can modify and/or regenerate any flight plan that is not manually and/or preapproved by a respective aerial vehicle operator.

After the flight planning system generates the set of potential flight plans for the fleet and flight planning period, the set of potential flight plans can be exposed to a ride sharing network. In particular, a matching system of the ride sharing network can match one or more passengers of the network with a particular flight plan according to a matching process, thereby causing the flight plan to be engaged for operation. In some implementations, the matching system can perform passenger pooling in which multiple requests for service are collected from users over a period and the matching services collectively analyzes the requests to identify opportunities to pool passengers together. Although aspects of the present disclosure focus on providing aerial transportation services to human passengers, the systems and methods of the present disclosure are equally applicable to determining flight plans for aerial transportation services to non-human payloads, such as packages, prepared foods, pet transportation, and/or the like.

In some implementations, the set of potential flight plans can be exposed to the ride sharing network with minimal details. For example, the potential flight plans can be described by data indicative of a number of passengers and/or trips that can be serviced during a block of time at, between, and/or to a plurality of locations. The passengers of the ride sharing network can book a trip by booking an aerial transport over a block of time. The booked block of time can be utilized by the ride sharing network to match a passenger to a flight from the potential set of flights.

By way of example, passengers of the ride sharing network can book travel (e.g., generally, flight specific, etc.) for a block of time. The block of time can be descriptive of a time slot container and can be used as an input for generating an engaged flight plan. The ride sharing network can receive a plurality of requests, group the plurality of requests within one or more time slot containers, and wrap a flight around the time slot container. The passengers can be given a price estimate, but not be charged until after the performance of the flight. Before the performance of the flight, the passenger can be provided information such as an aircraft type assigned to perform the flight, a time slot associated with the flight, and/or any other information associated with the engaged flight.

In this manner, an engaged flight plan can be generated by adding passengers to a potential flight plan of the set of potential flight plans. Thus, an engaged flight plan can include a potential flight plan with one or more assigned passengers. For example, each engaged flight plan can be associated with one or more assigned passengers of the passengers associated with the ride sharing network. In addition, the engaged flight plan can include a scheduled take-off time, a scheduled landing time, and a buffer time period. The buffer time period can be indicative of a delay from the scheduled take-off time. This can be, for example, a time period that is understood to be acceptable to passengers. Acceptability can be based on feedback data provided via passenger(s) through a software application running on a user device. For example, the software application can provide a prompt to gather feedback from the passenger regarding the passenger's experience including, for example, the passenger's satisfaction or dissatisfaction level with a delay. Feedback data from specific passengers can be stored for a determination of acceptability for a particular passenger (e.g., which can be if they are included on a later flight) and/or aggregated with feedback data from one or more other passenger(s) to determine whether a time period would represent an acceptable delay to other passenger(s). In some implementations, the aggregated data can be utilized for determining an acceptable delay for a passenger that previously provided feedback data or not. The buffer time period can be determined based, at least in part, on the input data, the one or more constraints (e.g., weather, traffic, deviations, etc.), and/or the time period. For example, the engaged flight plan can form a user-centric flight schedule with an adjustable take-off time based, at least in part, on the assigned passengers associated with the engaged flight plan. This adjustable, user-centric, take-off time can be represented by the buffer time period.

More particularly, the engaged flight plan can include a buffer time period determined based on holistic inputs centered around passenger convenience. By way of example, the flight planning system can generate an engaged flight plan based, at least in part, on one or more assigned passengers (e.g., added by the ride sharing network). The flight planning system can determine a buffer time period for the engaged flight plan based, at least in part, on the one or more assigned passengers of the engaged flight plan.

For example, each of the one or more assigned passengers can be associated with a multi-leg travel itinerary. The multi-leg travel itinerary can include, for example, multiple travel legs via one or more different modalities. For instance, one leg of the multi-leg travel itinerary can include the engaged flight plan. Additional travel legs can include ground transportation to an origin location of the engaged flight plan, another ground transportation from the destination location of the engaged flight plan, and/or one or more additional flight legs preceding and/or subsequent to the engaged flight plan.

In some implementations, the flight planning system can determine the buffer time period based, at least in part, on the multi-leg travel itinerary for each of the one or more assigned passengers. For instance, the multi-leg travel itinerary can be associated with a total estimated travel time for an assigned passenger. In such a case, the buffer time period can be determined based, at least in part, on an aggregated delay period to the multi-leg travel itinerary of each of the one or more assigned passengers as a result of delaying the engaged flight plan by one or more different periods of time. The buffer time period, for example, can be determined to ensure that the aggregated delay period is less than a threshold time (e.g., one or more hour(s), 30 minutes, 10 minutes, etc.). In some cases, the threshold time can include a time period less than the duration of an engaged flight. As one example, the flight planning system can predict a higher rate of traffic for ground transportation a first time period after the engaged flight. In such a case, the flight planning system can determine a buffer time period that is less than the first time period to prevent the affected passenger from being further delayed by foreseeable traffic.

In addition, or alternatively, the buffer time period can be determined based, at least in part, on a number of the one or more assigned passengers that will have a change to their multi-leg travel itinerary as a result of delaying the engaged flight plan by one or more different periods of time. For example, the buffer time period can be determined to avoid causing one or more assigned passengers to miss a subsequent flight.

A computing system that includes the flight planning system can continuously monitor the success/viability of each engaged flight plan. For example, the computing system can monitor real-time data such as aircraft location data (e.g., received from a GPS system of the aircraft), aircraft sensor data (e.g., fuel/charge levels, etc.), passenger location data (e.g., with permission, received from a passenger's computing device), weather data, ground-based transportation data, and/or other forms of data to detect current or likely deviations of the fleet of aircraft and/or passengers from engaged flight plans. In particular, the computing system can monitor and evaluate the estimated times of arrival for some or all passengers versus planned times of arrival, the estimated times of arrival for some or all aircraft versus planned times of arrival, and/or other measures of success of flight plans.

Thus, the computing system can continuously assess whether flights will successfully depart and/or arrive at their scheduled times, including tracking whether assigned passengers will be able to successfully arrive at the departing transportation node in sufficient time to physically progress through the transportation node and embark on the aircraft. In particular, in some implementations, the estimated arrival time can be for a passenger and can be based on a first leg of a multi-leg itinerary. For example, a user may use ground-based transportation (e.g., a ride shared car) to get to the transportation node and, as such, the computing system can track the user's progress along the ground-based transportation leg to assess whether the user will arrive in sufficient time to avoid delaying their associated flight (e.g., which may be the second leg of the multi-leg itinerary).

The computing system can track the user location, for example, by receiving location data associated with one or more of the one or more passengers. For example, the computing system can interact with the ride sharing network to receive updates to a passenger's location. As an example, the computing system can receive passenger location data associated with a respective passenger from a ground vehicle device assigned to the respective passenger for providing ground transportation to the respective passenger before a respective engaged flight plan for the passenger. The location data can be received in real-time, periodically, during the course of travel from the passenger's origin location to the first transportation node. In addition, or alternatively, the location data can be received in response to a detected deviation from an original estimated time of arrival. For example, the location data for a passenger can be indicative of a delayed or earlier estimated time of arrival for a passenger. In some implementations, the location data can include traffic information, driver information, flight information, and/or any other information associated with a passenger's transportation to a first transportation node of the engaged flight.

The computing system can perform real-time mitigation and replanning when a particular flight plan becomes significantly delayed or cancelled/unfulfilled. Typically, the computing system can attempt to delay replanning activities until it is believed with significant probability that an engaged flight plan will not be able to be successfully completed.

In addition, or alternatively, the computing system can perform real-time mitigation and replanning based, at least in part, on one or more deviations of the one or more passengers. For example, the computing system can reoptimize the set of potential flight plans and/or the one or more engaged flight plans based, at least in part, on minimizing inconveniences to passengers. By way of example, the computing system can determine a mitigation action (e.g., delay a flight, reassign one or more passengers to different engaged flights, etc.) in response to one or more deviations of the fleet of aircraft and/or passengers. For each available mitigation action, the computing system can determine a number of passengers that will be impacted as a result of the mitigation action. By way of example, the computing system can determine a number of passengers that will miss their arrive by times as a result of the mitigation action, an aggregate time period (e.g., one or more hours, minutes, etc.) that will be added to all the passengers' transportation services as a result of the mitigation action, and/or other metrics. In this manner, the computing system can adjust one or both of the engaged flight plans and/or the set of potential flight plans to account for the one or more deviations without negatively impacting the convenience of passengers engaged in an on demand transportation service.

In some implementations, the mitigation process can include delaying a flight based on the buffer time period of an engaged flight plan. For example, the buffer time period can be indicative of a time period before and/or after a scheduled take-off that is allowable for the aircraft. For example, allowances can be made for accommodating a late and/or early passenger based, at least in part, on an understanding of the user (e.g., location thereof) and other pooled users associated with the engaged flight. For example, the buffer time period can be determined based on a group inconvenience factor and/or a trickle down impact of a delay take-off time. The computing system can determine that a deviation is due to a late assigned passenger for an engaged flight plan. The computing system can determine an estimated time of arrival for the late assigned passenger and determine an adjustment for the engaged flight plan based, at least in part, on the estimated time of arrival for the late assigned passenger and the buffer time period. The computing system can apply the adjustment to the engaged flight plan.

By way of example, in response to determining that the estimated time of arrival for the late assigned passenger is after the scheduled take-off time by a time period greater than the buffer time period, the computing system can add the late assigned passenger to one or more of the set of potential flight plans (and/or engaged flight plans with space for the late assigned passenger). In addition, or alternatively, in response to determining that the estimated time of arrival for the late passenger is after the scheduled take-off time and within the buffer time period, the computing system can delay the scheduled take-off time for the engaged flight plan to accommodate the late assigned passenger. In some implementations, the computing system can automatically transmit notifications to one or more of: the late assigned passenger (e.g., via a user device), operations personnel (e.g., via operational devices), and/or aircraft operators (e.g., via aircraft devices).

In some implementations, the mitigation process can include manual inputs by human mitigation personnel. For example, the need to perform mitigation can be automatically detected and, as a result, the computing system can provide an alert and a mitigation user interface to a human mitigation personnel. For example, the mitigation user interface can include a graphical user interface that shows potential alternative flight plans for and/or changes to a flight plan that is currently subject to delay/cancellation. As one example, the human personnel can interact with the interface to adjust various parameters of one or more flight plans. For example, the human personnel can alter flight departure times, alter buffer times associated with physical passage of passengers through transportation nodes and/or vehicle embarkation/disembarkation, add or remove passengers from flights, move passengers between flights, change pilots, and/or other actions to manually alter the set of flight plans. In some implementations, any downstream effects on the flight plans from a manual change can be automatically computed and propagated through the set of flight plans.

In some implementations, the user interface can provide warnings or other indications of how certain mitigation activities or potential actions might affect other users of the system and/or violate certain of the initial input constraints. For example, if the mitigation personnel attempts to delay a not-yet-departed flight plan to wait for a delayed user, the user interface can inform the mitigation personnel that such action would impact one or more other travelers (e.g., 3 other travelers). The warnings/indications provided in the user interface can provide impact information according to various metrics including, for each available choice/action, a number of users that will be impacted as a result of the choice/action, a number of users that will miss their arrive by times as a result of the choice/action, an aggregate time period that will be added to all the users' transportation services as a result of the choice/action, and/or other metrics. Generally, preference can be given to mitigation strategies that have minimal impacts on other passengers. In addition, certain constraints (e.g., final aircraft destination at the end of the flight planning period) can be manually violated while other constraints (e.g., safety constraints such as maximum weight in the aircraft) cannot be manually violated.

In another example, a human personnel can change one or more constraints and then rerun the flight planning process. For example, if extreme weather renders a certain subset of the transportation nodes unusable for a period of time, the human personnel can adjust the constraints to mark the subset of transportation nodes as unavailable for the period of time and then rerun the flight planning process. Thus, certain adjustments can be made directly to individual flight plans while other adjustments may require a system-wide readjustment or replanning.

In some implementations, the mitigation process can be automated (e.g., with the ability for manual overrides). As an example, the computing system can continuously generate contingency flight plans. For example, the contingency flight plans can be generated using a process as described above but taking into account potential or actual delays in certain flight plans. When it is detected that mitigation interventions should be performed, the computing system can automatically select the best available contingency flight plans and push the selected flight plans out to each aircraft and other system component. For example, automatic updates and alerts can be sent to passengers, aircraft providers, operations personnel, and/or other integrated systems. The contingency flight plans can be ranked based on various metrics including, for each potential set of updated flight plans, a number of passengers that will be impacted as a result of the choice/action, a number of passengers that will miss their arrive by times as a result of the choice/action, an aggregate time period that will be added to all the passengers' transportation services as a result of the choice/action, and/or other metrics. Alternatively, or additionally, the objective function(s) can be used to score the contingency flight plans and/or replan for some or all of the fleet of aircraft. Thus, in some instances, the dynamic contingency generation can be viewed as a continuous fleet-wide reoptimization of flight plans based on real-time conditions.

In some implementations, the mitigation process can be automated and implemented within the bounds of preapproval criteria established by the one or more aircraft operators. For example, the computing system can detect one or more deviations of the fleet of aircraft and/or the one or more passengers from the engaged flight plans. The computing system can determine an adjustment for at least one of the engaged flight plans and/or the set of potential flight plans to accommodate for the one or more deviations. The computing system can compare the adjustment to preapproval criteria for an operator of the at least one of the engaged flight plans or the set of potential flight plans. In response to determining that the adjustment achieves the preapproval criteria, the computing system can automatically adjust the at least one of the engaged flight plan and/or the set of potential flight plans. In response to determining that the adjustment does not achieve the preapproval criteria, the computing system can transmit data indicative of the adjustment to human mitigation personnel.

Thus, systems and methods of the present disclosure can generate potential flight plans to be used by a ride sharing network, including, in some implementations, dynamic and/or automated changes to flight plans based on real-time information. In particular, the systems and methods of the present disclosure can operate to generate a fleet-level set of potential flight plans which comply with one or more constraints for a fleet of aircraft and can provide manual and/or automatic tools for flight plan adjustment to, for example, handle and mitigate delays or other real-time impacts that cause deviation of the fleet of aircraft from the set of flight plans.

With reference now to the Figures, example embodiments of the present disclosure will be discussed in further detail.

Example Devices and Systems

FIG. 1 depicts a block diagram of an example computing system 100 according to example embodiments of the present disclosure. The computing system 100 includes a cloud services system 102 that can operate to plan and fulfill transportation services.

The cloud services system 102 can be communicatively connected over a network 180 to one or more rider computing devices 140, one or more service provider computing devices 150 for a first transportation modality, one or more service provider computing devices 160 for a second transportation modality, one or more service provider computing devices 170 for an Nth transportation modality, and one or more infrastructure and operations computing devices 190.

Each of the computing devices 140, 150, 160, 170, 190 can include any type of computing device such as a smartphone, tablet, hand-held computing device, wearable computing device, embedded computing device, navigational computing device, vehicle computing device, etc. A computing device can include one or more processors and a memory (e.g., similar to as will be discussed with reference to processors 112 and memory 114). Although service provider devices are shown for N different transportation modalities, any number of different transportation modalities can be used, including, for example, less than the three illustrated modalities (e.g., two modalities can be used). Service providers can include human operators of vehicles or the vehicles themselves.

The cloud services system 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage media, such as RAM, ROM, EEPROM, EPROM, one or more memory devices, flash memory devices, etc., and combinations thereof.

The memory 114 can store information that can be accessed by the one or more processors 112. For instance, the memory 114 (e.g., one or more non-transitory computer-readable storage mediums, memory devices) can store data 116 that can be obtained, received, accessed, written, manipulated, created, and/or stored. In some implementations, the cloud services system 102 can obtain data from one or more memory device(s) that are remote from the system 102.

The memory 114 can also store computer-readable instructions 118 that can be executed by the one or more processors 112. The instructions 118 can be software written in any suitable programming language or can be implemented in hardware. Additionally, or alternatively, the instructions 118 can be executed in logically and/or virtually separate threads on processor(s) 112. For example, the memory 114 can store instructions 118 that when executed by the one or more processors 112 cause the one or more processors 112 to perform any of the operations and/or functions described herein. By way of example, the memory 114 can include instructions 118 that when executed by the one or more processors 112 cause the one or more processors 112 to perform operations of the flight planning system described herein.

The cloud services system 102 can include a number of different systems such as a world state system 126, a forecasting system 128, an optimization/planning system 130, and a matching and fulfillment system 132. The matching and fulfillment system 132 can include a different matching system 134 for each transportation modality and a monitoring and mitigation system 136. Each of the systems 126-136 can be implemented in software, firmware, and/or hardware, including, for example, as software which, when executed by the processors 112 cause the cloud services system 102 to perform desired operations. The systems 126-136 can cooperatively interoperate (e.g., including supplying information to each other).

The world state system 126 can operate to maintain data descriptive of a current state of the world. For example, the world state system 126 can generate, collect, and/or maintain data descriptive of predicted rider demand; predicted service provider supply; predicted weather conditions; planned itineraries; predetermined transportation plans (e.g., flight plans) and assignments; current requests; current ground transportation service providers; current transportation node operational statuses (e.g., including recharging or refueling capabilities); current aircraft statuses (e.g., including current fuel or battery level); current aircraft pilot statuses; current flight states and trajectories; current airspace information; current weather conditions; current communication system behavior/protocols; and/or the like. The world state system 126 can obtain such world state information through communication with some or all of the devices 140, 150, 160, 170, 190. For example, devices 140 can provide current information about riders while devices 150, 160, and 170 can provide current information about service providers. Devices 190 can provide current information about the status of infrastructure and associated operations/management.

The forecasting system 128 can generate predictions of the demand and supply for transportation services at or between various locations over time. The forecasting system 128 can also generate or supply weather forecasts. The forecasts made by the system 128 can be generated based on historical data and/or through modeling of supply and demand. In some instances, the forecasting system 128 can be referred to as an RMR system, where RMR refers to "routing, matching, and recharging." The RMR system can be able to simulate the behavior of a full day of activity across multiple ride share networks.

The optimization/planning system 130 can generate transportation plans for various transportation assets and/or can generate itineraries for riders. For example, the optimization/planning system 130 can perform flight planning for a fleet of aircraft (e.g., through performance of any of the methods described herein including methods 400, 500, and 600 of FIGS. 4, 5, and 6). As another example, optimization/planning system 130 can plan or manage/optimize itineraries which include interactions between riders and service providers across multiple modes of transportation.

The matching and fulfillment system 132 can match a rider with a service provider for each of the different transportation modalities. For example, each respective matching system 134 can communicate with the corresponding service provider computing devices 150, 160, 170 via one or more APIs or connections. Each matching system 134 can communicate trajectories and/or assignments to the corresponding service providers. Thus, the matching and fulfillment system 132 can perform or handle assignment of ground transportation, flight trajectories, take-off/landing, etc.

The monitoring and mitigation system 136 can perform monitoring of user itineraries and can perform mitigation when an itinerary is subject to significant delay (e.g., one of the legs fails to succeed). Thus, the monitoring and mitigation system 136 can perform situation awareness, advisories, adjustments, and the like. The monitoring and mitigation system 136 can trigger alerts and actions sent to the devices 140, 150, 160, 170, and 190. For example, riders, service providers, and/or operations personnel can be alerted when a certain transportation plan has been modified and can be provided with an updated plan/course of action. Thus, the monitoring and mitigation system 136 can have additional control over the movement of aircraft, ground vehicles, pilots, and riders.

In some implementations, the cloud services system 102 can also store or include one or more machine-learned models. For example, the models can be or can otherwise include various machine-learned models such as support vector machines, neural networks (e.g., deep neural networks), decision-tree based models (e.g., random forests), or other multi-layer non-linear models. Example neural networks include feed-forward neural networks, recurrent neural networks (e.g., long short-term memory recurrent neural networks), convolutional neural networks, or other forms of neural networks.

In some instances, the service provider computing devices 150, 160, 170 can be associated with autonomous vehicles. Thus, the service provider computing devices 150, 160, 170 can provide communication between the cloud services system 102 and an autonomy stack of the autonomous vehicle which autonomously controls motion of the autonomous vehicle.

The infrastructure and operations computing devices 190 can be any form of computing device used by or at the infrastructure or operations personnel including, for example, devices configured to perform passenger security checks, luggage check in/out, recharging/refueling, safety briefings, vehicle check in/out, and/or the like.

The network(s) 180 can be any type of network or combination of networks that allows for communication between devices. In some embodiments, the network(s) can include one or more of a local area network, wide area network, the Internet, secure network, cellular network, mesh network, peer-to-peer communication link and/or some combination thereof and can include any number of wired or wireless links. Communication over the network(s) 180 can be accomplished, for instance, via a network interface using any type of protocol, protection scheme, encoding, format, packaging, etc.

Example Fixed Infrastructure

Figure 2:
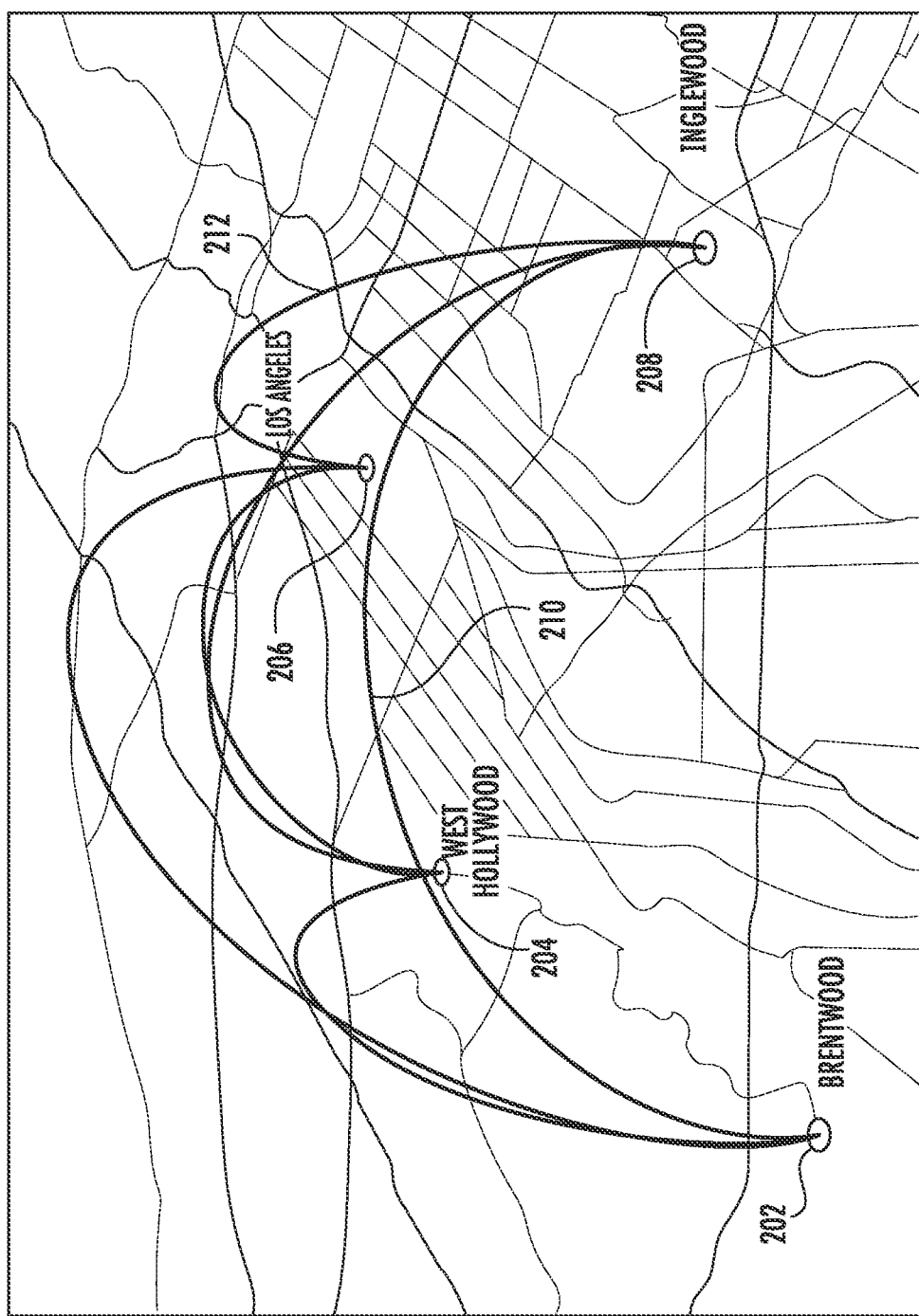
FIG. 2 depicts a graphical diagram of an example set of flight paths between an example set of transportation nodes according to example embodiments of the present disclosure.

FIG. 2 depicts a graphical diagram of an example set of flight plans between an example set of transportation nodes according to example embodiments of the present disclosure. In particular, FIG. 2 provides a simplified illustration of an example fixed infrastructure associated with flight-based transportation in an example metropolitan area. As illustrated in FIG. 2, there are four transportation nodes which may be referred to as "skyports" (e.g., vertiports, verti-hubs, etc.) For example, a first transportation node 202 is located in a first neighborhood of the metropolitan area, a second transportation node 204 is located in a second neighborhood, a third transportation node 206 is located in a third neighborhood, and a fourth transportation node 208 is located in a fourth neighborhood. The location and number of transportation nodes is provided only as an example. Any number of transportation nodes at any different locations can be used.

Flights are available (e.g., may be preplanned) between certain pairs of the transportation nodes. For example, a flight path 210 exists between the first transportation node 202 and the fourth transportation node 208. Likewise, a flight path 212 exists between the fourth transportation node 208 and the third transportation node 206.

Figure 3:
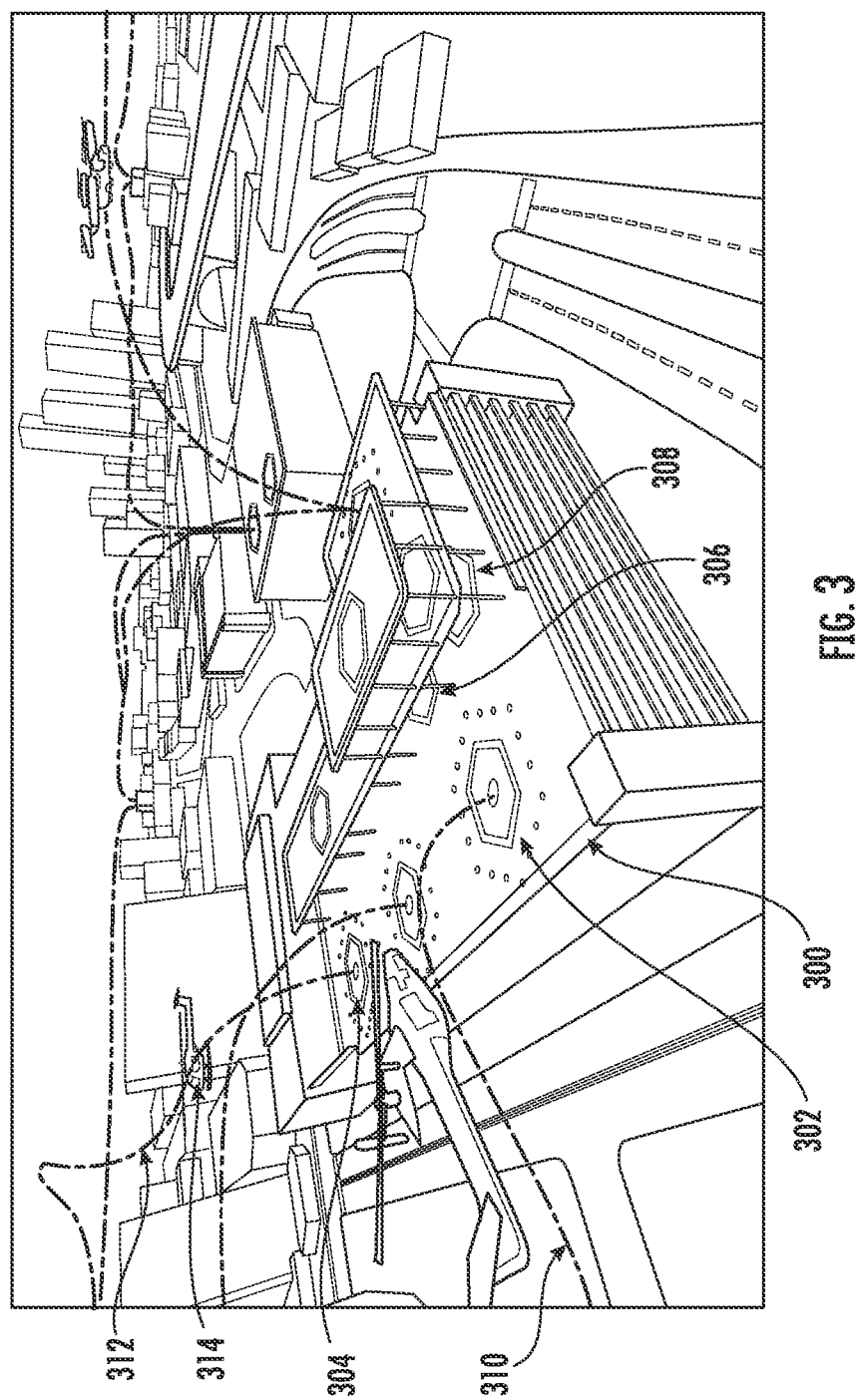
FIG. 3 depicts a graphical diagram of an example transportation node according to example embodiments of the present disclosure.

FIG. 3 depicts a graphical diagram of an example transportation node 300 according to example embodiments of the present disclosure. The example transportation node 300 includes a number of take-off/landing pads such as pads 302 and 304. The example transportation node 300 also includes a number of vehicle parking locations such as parking locations 306 and 308. For example, refueling or recharging infrastructure may be accessible at each parking location.

Flight trajectories into and out of the transportation node 300 may be defined, configured, assigned, communicated, etc. FIG. 3 illustrates a number of flight trajectories including, for example, trajectories 310 and 312. The trajectories can be fixed or can be dynamically computed. The trajectories can be computed by the aircraft or can be centrally computed and then assigned and communicated to the aircraft. As one example, FIG. 3 illustrates a helicopter 314 taking off from the pad 304 according to the trajectory 312.

Example Methods

Figure 4:
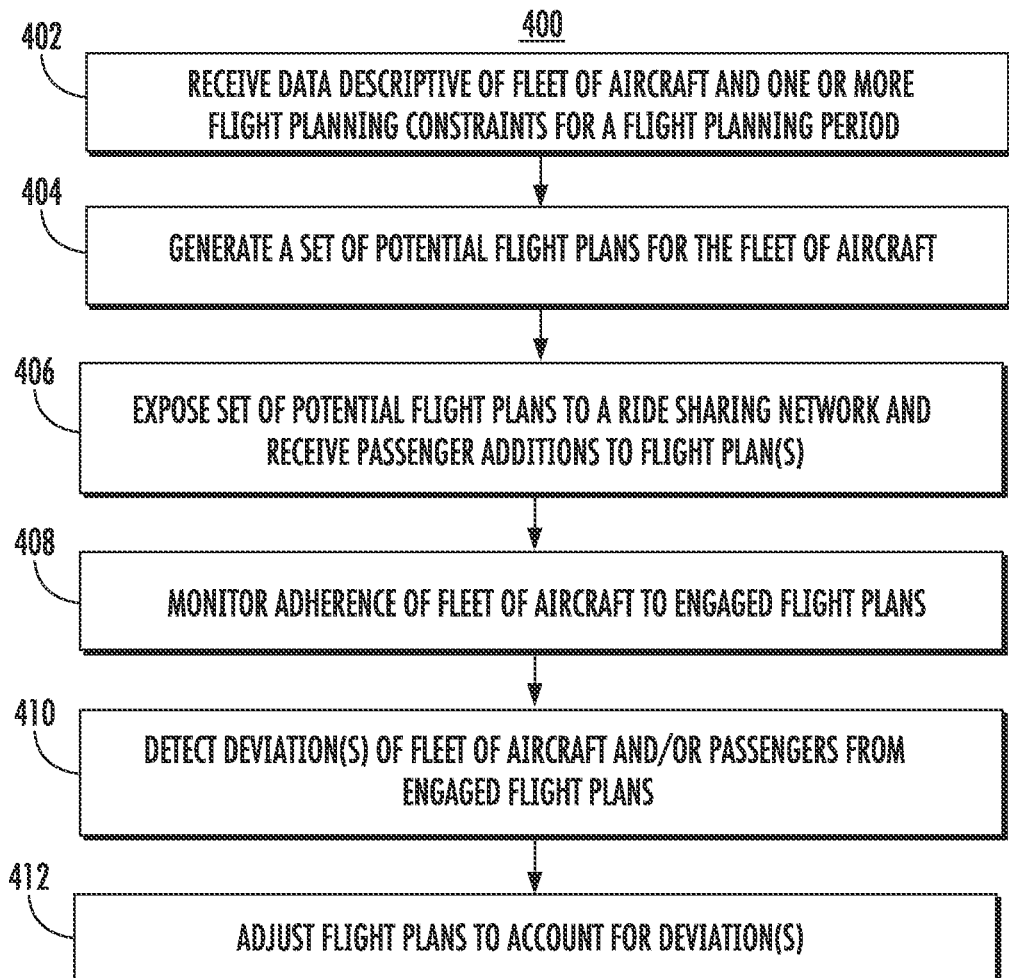
FIG. 4 depicts a flow chart diagram of an example method to generate and use a set of flight plans within a ride sharing network according to example embodiments of the present disclosure.

FIG. 4 depicts a flow chart diagram of an example method 400 to generate and use a set of flight plans within a ride sharing network according to example embodiments of the present disclosure. One or more portion(s) of the method 400 can be implemented by a computing system that includes one or more computing devices such as, for example, the computing systems described with reference to the other figures (e.g., flight planning system, computing system 100, cloud services system 102, world state system(s) 126, forecasting system 128, optimization/planning system 130, matching and fulfillment system 132, etc.). Each respective portion of the method 400 can be performed by any (or any combination) of one or more computing devices. Moreover, one or more portion(s) of the method 400 can be implemented as an algorithm on the hardware components of the device(s) described herein (e.g., as in FIGS. 1-3, etc.), for example, to generate a set of flight plans. FIG. 4 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure. FIG. 4 is described with reference to elements/terms described with respect to other systems and figures for exemplary illustrated purposes and is not meant to be limiting. One or more portions of the method 400 can be performed additionally, or alternatively, by other systems.

At (402), the method 400 can include receiving data descriptive of a fleet of aircraft and one or more flight planning constraints for a flight planning period. For example, a computing system (e.g., computing system 100, cloud services system 102, world state system(s) 126, forecasting system 128, optimization/planning system 130, matching and fulfillment system 132) can receive data descriptive of a fleet of aircraft and one or more flight planning constraints for a flight planning period. The computing system (e.g., the optimization and planning system 130, etc.) can receive a set of input data that describes a fleet of aircraft, one or more flight planning constraints, and/or a flight planning period. The input data can be provided by one or more systems and/or devices of a ridesharing environment. For instance, the input data can include rider data received via one or more rider computing device(s) 140 of FIG. 1, service provider data received from one or more service provider devices 150, 160, 170, of FIG. 1, infrastructure data received from one or more infrastructure and operations computing devices 190, world state data received from one or more world state systems 126, forecasting data received from one or more forecasting systems 128, and/or any other information associated with a ride sharing network.

The user input data can be input manually by a user (e.g., passenger, pilot, driver, operations personnel, etc.) and/or can be automatically ingested (e.g., periodically such as daily). For example, in some implementations, disparate aircraft owners/operators can interact (e.g., via service provider device(s) 150, 160, 170, etc.) with the computing system (e.g., application implemented thereby) to provide information on the availability of their aircraft for participation in the ride sharing network. The provided information can then be accessed by the computing system (e.g., optimization/planning system 130). In other implementations, information about the fleet of available aircraft comes from a single centralized source that oversees all aircraft operations.

The fleet of aircraft can include any number of aircraft of the same or different models owned and/or operated by one or more different aerial operators. Example aircraft that can be included in the fleet include helicopters or other vertical take-off and landing aircraft (VTOL) such as electric vertical take-off and landing aircraft (eVTOL). In some implementations, the fleet of aircraft can include aircraft that are capable of varying levels of autonomous flight/motion, including, non-autonomous aircraft, semi-autonomous aircraft, and full-autonomous aircraft. Each aircraft can be owned, maintained, and/or operated by one or more different aerial vehicle operators. By way of example, an aerial vehicle operator can include any entity with operational control (e.g., ownership, license, etc.) over one or more aerial vehicles. Each aerial vehicle operator can make the one or more aerial vehicles available during the flight planning period.

The flight planning period can define an overall start and end date and time for which the flight planning system should generate potential flight plans for the fleet of aircraft. Example flight planning periods include spans of 3 hours, 24 hours, a week, etc. The flight planning period can be continuous or include disjointed periods of time.

The constraints described by the set of input data can include any number of different constraints associated with each aircraft such as, as examples: a respective starting location for each aircraft; a respective ending location for each aircraft; respective times at which each aircraft is available or unavailable; respective starting fuel or charge levels for each aircraft; respective capabilities or attributes of each aircraft such as number of passenger seats available, maximum consecutive operational time, maximum or minimum flight range, maximum or minimum flight altitude, noise levels associated with operation of the aircraft, etc.

The constraints described by the set of input data can also describe a fixed infrastructure (e.g., as such as fixed infrastructure 300 of FIGS. 2-3) that the fleet of aircraft must utilize. In some implementations, the constraints described by the set of input data can also describe an availability of resources such as particular aircraft operators ("pilots"), operations personnel, physical resources available at a transportation node (e.g., machines for secure passenger intake, fuel, maintenance capabilities), etc. In some implementations, particular pilots can be linked with particular aircraft and treated as a single resource while, in other implementations, they can be treated as separate resources.

In some implementations, the input data to the computing system (e.g., optimization/planning system 130) can include world state and/or forecasted data (e.g., as determined/predicted by the world state system 126 and/or the forecasting system 128). For example, the input data can include forecasted demand data that can describe a forecasted demand for flight transportation at various times and locations over the flight planning period. The data can describe forecasted origins and destinations for the demand or may simply forecast the origin of the demand.

The forecasted demand data can be based, at least in part, on the ride sharing network. The ride sharing network (e.g., one or more device(s) 102, 140, 150, 160, 170, 190 thereof) can determine forecasted demand data by leveraging data indicative of a number of real time requests and/or historical data indicative of the number of requests received from the plurality of different users (e.g., drivers, service providers, pilots, operational personnel, etc.) of the network. In this manner, the forecasted demand data can be determined based, at least in part, on the ride sharing network. By way of example, the forecasted demand data can include the historical and/or real time requests from passengers of the ride sharing network and/or data determined based, at least in part, on the historical and/or real time requests from passengers of the ride sharing network and provided to the computing system (e.g., forecasting system 128).

As another example, the input data can include forecasted supply data that can describe the forecasted supply of ground-based transportation providers at different respective times and transportation locations over the flight planning period. The forecasted supply data can be based, at least in part, on the ride sharing network. For example, the ride sharing network (e.g., one or more device(s) 102, 140, 150, 160, 170, 190 thereof) can determine the forecasted supply data by identifying a number of service providers and/or assets that are available (e.g., opted in, etc.) for providing a transportation service at a plurality of different times and/or locations over the flight planning period. In this manner, the forecasted supply data can be determined (e.g., by the forecasting system 128). By way of example, the forecasted supply data can include historical and/or real time information identifying the availability of the number of service providers and/or assets of the ride sharing network and/or data determined based, at least in part, on the historical and/or real time availability of the number of service providers and/or assets of the ride sharing network and provided to the computing system (e.g., optimization/planning system 130).

At (404), the method 400 can include generating a set of potential flight plans for the fleet of aircraft. For example, the computing system (e.g., computing system 100, cloud services system 102, world state system(s) 126, forecasting system 128, optimization/planning system 130, matching and fulfillment system 132) can generate a set of potential flight plans for the fleet of aircraft. For instance, in response to the input data, the computing system (e.g., the optimization/planning system 130, etc.) can generate a set of potential flight plans for the fleet of aircraft over the flight planning period. Each potential flight plan can include various types of information such as, as examples: the identity of the aircraft, the identity of the pilot (if needed), the origin location, the destination location, a rough indication of flight path, an estimated time of departure, an estimated time of arrival, and/or various other information regarding the potential operation of an aircraft.

The computing system (e.g., the optimization/planning system 130, etc.) can generate the set of potential flight plans that maximize satisfaction of a combination of one or more objectives while also adhering to all of the constraints (i.e., not violating any of the constraints). As examples, the objectives considered by the computing system (e.g., the optimization/planning system 130, etc.) can include maximizing the number of potential flights generated, maximizing the ratio of potential flight plans that become engaged, maximizing the number of engaged flights that operate at maximum passenger capacity, maximizing the number of passengers to whom a flight is delivered, maximizing the number of passengers that arrive at their destination on time, minimizing the cumulative time period that passengers are delayed past their desired arrival time, and/or various other objectives. In some implementations, the computing system (e.g., the optimization/planning system 130, etc.) can use a fleet-level objective function that balances (e.g., using a set of weights) some or all of the different objectives described above. The set of weights can be manually tuned and/or automatically tuned (e.g., learned).

The computing system (e.g., the optimization/planning system 130, etc.) can perform one or more of various different algorithms to generate the set of potential flight plans. For example, in some implementations, the computing system (e.g., the optimization/planning system 130, etc.) can iteratively analyze the fleet of aircraft on an aircraft-by-aircraft basis, generating an optimal set of potential flight plans for each aircraft in turn. For example, the optimal set of potential flight plans for an aircraft can be generated by optimizing, for such aircraft, an aircraft-level objective function that balances (e.g., using a set of weights) a combination of any of the objectives described above. The set of weights in the aircraft-level objective function can be manually tuned and/or automatically tuned (e.g., learned). In some implementations, the aircraft-level objective function and the fleet-level objective function can be the same function and have the same weights. In some implementations, the fleet-level objective function can equal a sum of the aircraft-level objective function as respectively applied to all aircraft in the fleet.

Figure 5:
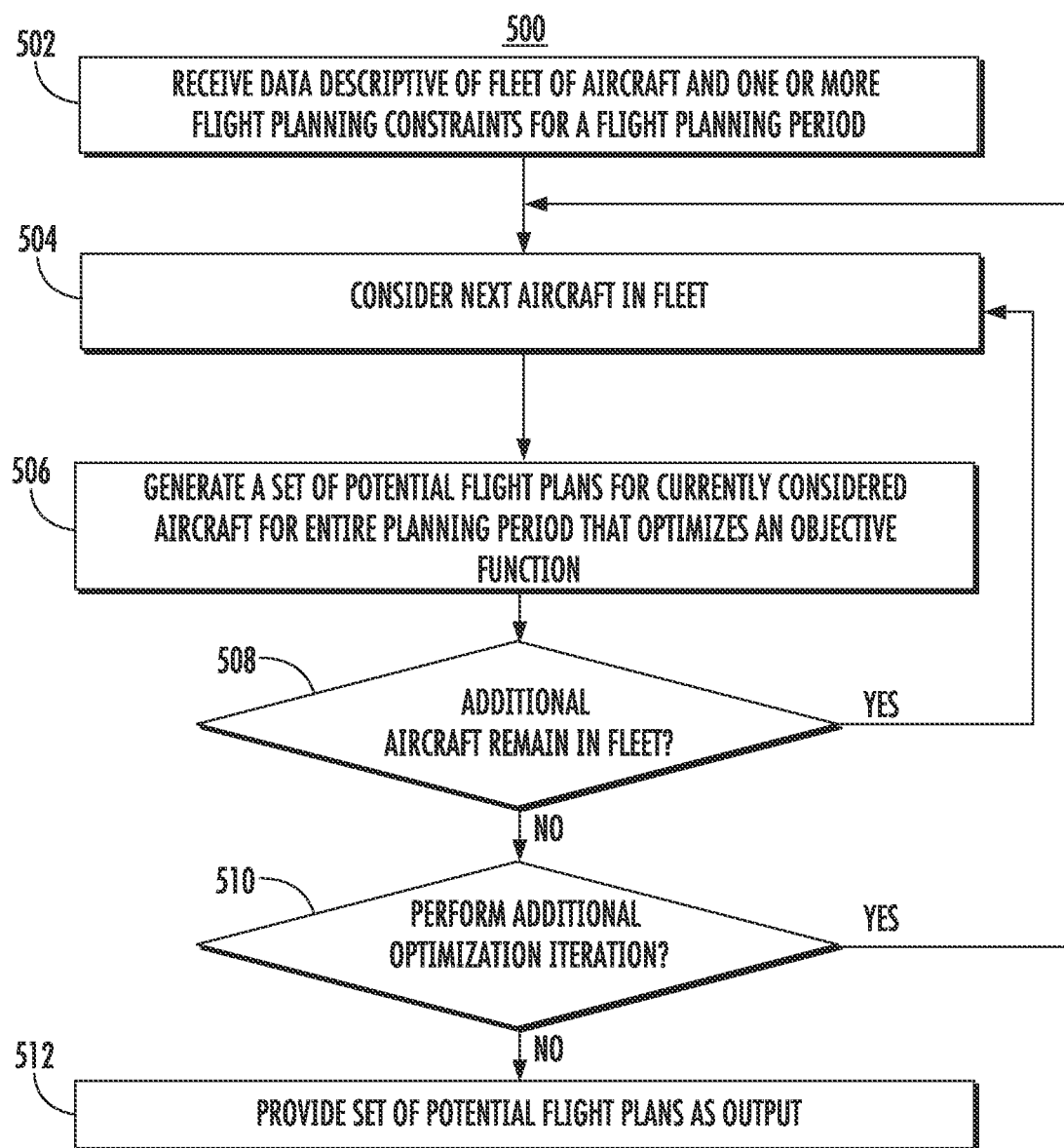
FIG. 5 depicts a flow chart diagram of an example method to generate a set of potential flight plans on an aircraft-by-aircraft basis according to example embodiments of the present disclosure.

For example, FIG. 5 depicts a flow chart diagram of an example method 500 to generate a set of potential flight plans on an aircraft-by-aircraft basis according to example embodiments of the present disclosure. One or more portion(s) of the method 500 can be implemented by a computing system that includes one or more computing devices such as, for example, the computing systems described with reference to the other figures (e.g., flight planning system, computing system 100, cloud services system 102, world state system(s) 126, forecasting system 128, optimization/planning system 130, matching and fulfillment system 132, etc.). Each respective portion of the method 500 can be performed by any (or any combination) of one or more computing devices. Moreover, one or more portion(s) of the method 500 can be implemented as an algorithm on the hardware components of the device(s) described herein (e.g., as in FIGS. 1-3, etc.), for example, to generate a set of flight plans on an aircraft-by-aircraft basis.

FIG. 5 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure. FIG. 5 is described with reference to elements/terms described with respect to other systems and figures for exemplary illustrated purposes and is not meant to be limiting. One or more portions of the method 500 can be performed additionally, or alternatively, by other systems.

At (502), the method 500 can include receiving the data descriptive of the fleet of aircraft and the one or more flight planning constraints for the flight period. For example, a computing system (e.g., flight planning system, computing system 100, cloud services system 102, world state system(s) 126, forecasting system 128, optimization/planning system 130, matching and fulfillment system 132, etc.) can receive the data descriptive of the fleet of aircraft and the one or more flight planning constraints for the flight period in the manner described herein (e.g., with reference to FIG. 4).

At (504), the method 500 can include considering a next aircraft in the fleet. For example, the computing system (e.g., the optimization/planning system 130, etc.) can consider the next aircraft in the fleet. At (506), the method 500 can include generating a set of potential flight plans for the currently considered aircraft for the entire planning period. For example, the computing system (e.g., the optimization/planning system 130, etc.) can generate a set of potential flight plans for the currently considered aircraft for the entire planning period. In particular, the set of potential flight plans can be flight plans that optimize an aircraft-level objective function.

For example, the computing system (e.g., the optimization/planning system 130, etc.) can generate a set of flight plans for a particular aircraft by starting at the beginning of the flight planning period and sequentially generating/adding flight plans for the aircraft until the end of the flight planning period is reached. As one example, at each instance in which the computing system (e.g., the optimization/planning system 130, etc.) attempts to generate a new flight plan for an aircraft, the computing system (e.g., the optimization/planning system 130, etc.) can generate a plurality of candidate flight plans, score each candidate flight plan according to the aircraft-level objective function, and then select and add the highest scoring flight plan for the aircraft.

As described herein, the aircraft-level objective function can balance any number of different objectives, including, as examples, various objectives which are a function of demand for the generated flight plan (e.g., total number of passengers serviced, total number of engaged flights, total number of flights that have all available seats filled, etc.). To evaluate such an objective function that includes objectives that are a function of demand, the system (e.g., the optimization/planning system 130, etc.) can query a demand model (e.g., of the world state/forecasting system(s) 126, 128, etc.) to obtain forecasted demand and/or supply information that can be used to evaluate such objectives. In another example, the aircraft-level objective function may focus (e.g., include as the sole objective) on maximizing the total number of flight plans generated.

In some implementations, the objective function can evaluate a set of flight plans based, at least in part, on an ultimate journey for a plurality of potential passengers. For example, an objective can include a function to reduce the total travel time for the plurality of passengers. By way of example, the demand data (e.g., from the world state/forecasting system(s) 126, 128, etc.) can include an anticipated demand (e.g., forecasted demand data determined by the forecasting system 128, etc.) for transportation services. At times, the transportation services can include multi-modal transportation services. In such a case, an aerial flight leg such as one of the set of potential flight plans can include one of multiple destinations for a passenger before the passenger reaches a final destination. The objective function can evaluate the set of flight plans based, at least in part, on the total estimated travel time for the plurality of passengers. For example, the computing system (e.g., optimization/planning system 130, etc.) can identify infrastructural, traffic, weather, and/or other factors that can have an impact on a subsequent ground transportation leg and optimize the set of potential flight plans to lower the total estimated travel time for users of the ride sharing network.

By way of example, the computing system (e.g., optimization/planning system 130, etc.) can take ground-based transportation information (e.g., provided by world state, forecasting system(s) 126, 128, service provider computing device(s) 150, 160, 170, infrastructure and operations computing device(s) 190, etc.) into account when generating the set of flight plans. For example, forecasted last mile supply availability can be used as an input to the aircraft-level objective function to reward (e.g., increase objective score for) flights that deliver passengers to destinations which have a robust supply of ground-based transportation services and to penalize (e.g., decrease objective score for) flights that deliver passengers to destinations which do not have a robust supply of ground-based transportation services. Similarly, forecasted first mile supply availability can be used as an input to the aircraft-level objective function to reward (e.g., increase objective score for) flights that collect passengers from departure nodes which have a robust supply of ground-based transportation services and to penalize (e.g., decrease objective score for) flights that collect passengers from departure nodes which do not have a robust supply of ground-based transportation services. In other implementations, such information regarding supply of transportation services according to other modalities can be assumed to be included in the forecasted demand data.

The computing system (e.g., optimization/planning system 130, etc.) can evaluate the set of flight plans based, at least in part, on how close the set of potential flight plans can transport potential passengers (e.g., expected based on forecasted demand data, etc.) to an expected ultimate destination. For example, the forecasted demand data can include an expected ultimate destination for each of a plurality of anticipated passengers. The computing system (e.g., optimization/planning system 130, etc.) can generate the set of potential flight plans in order to facilitate the transport of the plurality of anticipated passengers to a location (e.g., a transport node) closest to the expected ultimate destination.

In some implementations, the closest location (e.g., transport node) to the expected ultimate destination may not be the most efficient and/or timely route for transporting the plurality of anticipated passengers. For example, a subsequent ground transportation from the closest location can be affected by traffic and/or other roadway delays. Moreover, in some implementations, the flight plan to the closest location can be affected by weather or other airspace delays. In such a case, the computing system (e.g., optimization/planning system 130, etc.) can generate/evaluate the set of flight plans in order to facilitate the transport of the plurality of anticipated passengers to a location (e.g., a transport node) closest, temporally, to the expected ultimate destination such that factors affecting the subsequent transportation to an ultimate destination are accounted for.

In some implementations, the computing system (e.g., optimization/planning system 130, etc.) can include a greedy refueling component. The greedy refueling component can greedily assign an aircraft to participate in refueling and/or recharging whenever the aircraft is not in-flight (e.g., for more than a minimum amount of time) and refueling/recharging infrastructure (e.g., as indicated by infrastructure and operations computing device(s) 190, etc.) is available at the aircraft's current location. The greedy refueling component can be applied after generation of the flight plans or can be used as part of the generation process itself. In such fashion, the use of refueling/recharging infrastructure can be optimized.

In some implementations, the computing system (e.g., optimization/planning system 130, etc.) can perform or participate in an iterative learning process for weights of planning objective function(s). For example, an initial set of weights for the objective function(s) can be manually tuned. The computing system (e.g., optimization/planning system 130, etc.) can operate with the initial set of weights to generate any number of flight plans for any number of flight planning periods. Outcomes associated with the generated flight plans can be observed and measured according to various metrics. The set of weights can be retuned (e.g., automatically and/or manually) based on the observed outcomes. For example, various learning techniques such as gradient descent techniques can be applied to learn the set of weights. For example, gradient descent techniques can be applied to the weights of fleet-level objective function or the aircraft-level objective function. More generally, the computing system (e.g., optimization/planning system 130, etc.) can collect any data that describes the outcomes of certain manually-controlled settings, actions, weightings, decisions, and/or the like and can apply machine learning techniques to such data to learn updated or optimized versions of such settings, actions, weightings, decisions, and/or the like.

In this manner, the computing system (e.g., optimization/planning system 130, etc.) can automatically generate the set of potential flight plans for a fleet of aircraft owned and/or operated by one or more different aerial operators. In some implementations, each flight plan can be approved by a respective aerial vehicle operator (e.g., via service provider computing device(s) 150, 160, 170, etc.). For example, each aerial vehicle operator can be associated with a preapproval rule set. The preapproval ruleset, for example, can outline one or more acceptable flight plans (e.g., from/to/between one or more approved locations, within an approved time period, etc.) for aerial vehicles under the operational control of the respective aerial vehicle operator. In some implementations, the set of potential flight plans can only include approved flight plans. In addition, or alternatively, the set of potential flight plans can include unapproved flight plans. In such a case, the unapproved flight plans can be provided (e.g., escalated) to the respective aerial vehicle operator for manual approval. The computing system (e.g., optimization/planning system 130, etc.) can modify and/or regenerate any flight plan that is not manually and/or preapproved by a respective aerial vehicle operator.

At (508), the method 500 can include determining whether additional aircraft remain in the fleet. For example, the computing system (e.g., the optimization/planning system 130, etc.) can determine whether additional aircraft remain in the fleet.

If additional aircraft remain, then method 500 can return to (504) and consider the next aircraft in the fleet. However, if it is determined, at (508), that all aircraft in the fleet have been considered, then method 500 can proceed to (510)

At (510), the method 500 can include determining whether an additional optimization iteration should be performed. For example, the computing system (e.g., the optimization/planning system 130, etc.) can determine whether an additional optimization iteration should be performed. Any number of iterations can be performed to allow for the flight plans generated for different aircraft to balance and move around each other. For example, the aircraft can be considered in a different sequence at each iteration. Iterations can be performed until one or more stopping criteria are met. Stopping criteria can include a loop counter meeting a threshold, iteration-over-iteration change in objective function score(s) falling below a threshold, raw objective function score(s) exceeding a threshold, and/or other criteria. However, in some instances, only a single iteration is performed.

If it is determined, at (510), that an additional iteration should be performed, then method 500 can return to block (504) and perform another iteration of plan generation for some or all of the fleet. However, if it is determined, at (510), that an additional iteration should not be performed, then method 500 can proceed to (512).

At (512), the method 500 can include providing the set of potential flights as an output. For example, the computing system (e.g., the optimization/planning system 130, etc.) can provide the set of potential flights as an output. As an example, the set of potential flights can be output to a matching and fulfillment system (e.g., matching and fulfillment system 132 of FIG. 1) configured to add passengers to one or more of the set of potential flights to generate one or more engaged flights.

Figure 6:
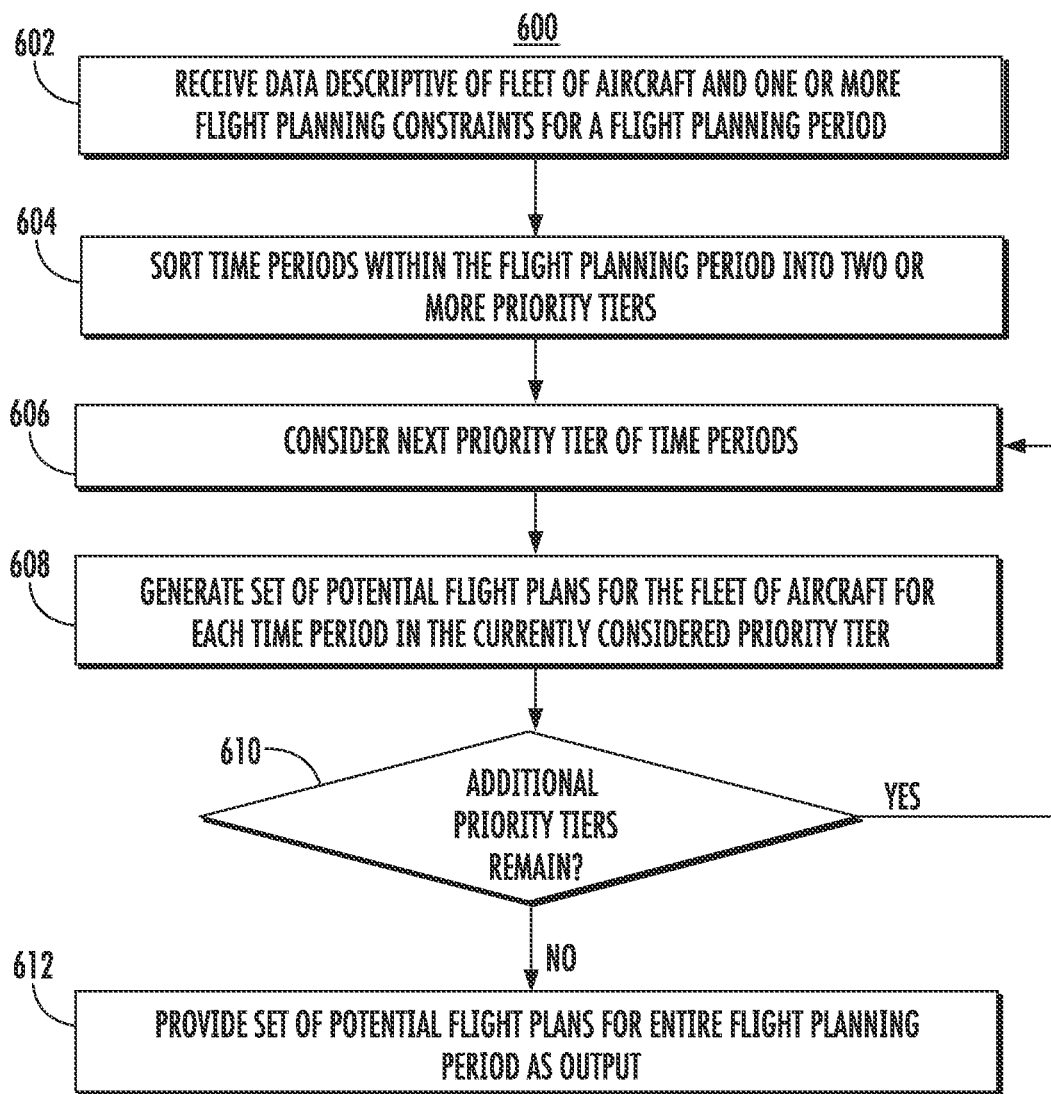
FIG. 6 depicts a flow chart diagram of an example method to generate a set of potential flight plans based on priority tiers according to example embodiments of the present disclosure.

As another example, FIG. 6 depicts a flow chart diagram of an example method 600 to generate a set of potential flight plans based on priority tiers according to example embodiments of the present disclosure. One or more portion(s) of the method 600 can be implemented by a computing system that includes one or more computing devices such as, for example, the computing systems described with reference to the other figures (e.g., flight planning system, computing system 100, cloud services system 102, world state system(s) 126, forecasting system 128, optimization/planning system 130, matching and fulfillment system 132, etc.). Each respective portion of the method 600 can be performed by any (or any combination) of one or more computing devices. Moreover, one or more portion(s) of the method 600 can be implemented as an algorithm on the hardware components of the device(s) described herein (e.g., as in FIGS. 1-3, etc.), for example, to generate a set of flight plans based on priority tiers. FIG. 6 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure. FIG. 6 is described with reference to elements/terms described with respect to other systems and figures for exemplary illustrated purposes and is not meant to be limiting. One or more portions of the method 600 can be performed additionally, or alternatively, by other systems.

At (602), the method 600 can include receiving the data descriptive of the fleet of aircraft and the one or more flight planning constraints for the flight period. For example, a computing system (e.g., flight planning system, computing system 100, cloud services system 102, world state system(s) 126, forecasting system 128, optimization/planning system 130, matching and fulfillment system 132, etc.) can receive the data descriptive of the fleet of aircraft and the one or more flight planning constraints for the flight period in the manner described herein (e.g., with reference to FIG. 4).

At (602), the method 600 can include sorting time periods within the flight planning period into two or more priority tiers. For example, the computing system (e.g., optimization/planning computing system 130, etc.) can sort the plurality of time periods within the flight planning period into two or more priority tiers.

At (606), the method 600 can include considering the next priority tier of time periods. For example, the computing system (e.g., optimization/planning computing system 130, etc.) can consider the next priority tier of time periods. For instance, at the first instance of (606), the computing system (e.g., optimization/planning computing system 130, etc.) can consider the highest priority tier of time periods. By way of example, in the multi-tiered approach, the computing system (e.g., optimization/planning computing system 130, etc.) can iteratively consider (e.g., by generating flight plans, etc.) the time periods in each priority tier, starting with the highest priority tier first. Thus, after considering the time periods of the highest priority tier, the computing system (e.g., optimization/planning computing system 130, etc.) can then consider the time periods of the next-highest priority tier.

At (608), the method 600 can include generating a set of potential flight plans for the fleet of aircraft for each time period in the currently considered priority tier. For example, the computing system (e.g., optimization/planning computing system 130, etc.) can generate the set of potential flight plans for the fleet of aircraft for each time period in the currently considered priority tier. For example, method 500 of FIG. 5 can be performed for each time period in the currently considered priority tier. Each tier of time periods can use the generated flight plans for the previous tier(s) as constraints for the scheduling process. For example, if the generated flight plans for the time period of 4 pm to 7 pm require that a given aircraft start at a particular transportation node and with a particular fuel/charge level, then, when generating flight plans for the time period of 1 pm to 4 pm, the flight planning system can treat as constraints the fact that the aircraft needs to end the 1-4 pm time period at the particular transportation node and with the particular fuel/charge level. In such fashion, flight plans can be optimized specifically for the highest priority time periods in which, for example, the largest number of passengers need to be serviced.

At (610), the method 600 can include determining whether additional priority tiers remain. For example, the computing system (e.g., optimization/planning system 130, etc.) can determine whether additional priority tiers remain. If additional priority tiers remain, then method 600 can return to 606 and consider the next priority tier of time periods. However, if it is determined, at (610), that additional priority tiers do not remain, then method 600 can proceed to 612. At (612), the method 600 can include providing the set of potential flight plans for the entire flight planning period as an output. For example, the computing system (e.g., optimization/planning system 130, etc.) can provide the set of potential flight plans for the entire flight planning period as an output. As an example, the set of potential flight plans can be output to a matching and fulfillment system (e.g., matching and fulfillment system 132 of FIG. 1) configured to add passengers to one or more of the set of potential flights to generate one or more engaged flights.

Turning back to FIG. 4, the method 400, to generate and use a set of flight plans within a ride sharing network, can include generating one or more engaged flights based on a set of potential flight plans and passenger demand.

At (406), the method 400 can include exposing the set of potential flight plans (e.g., determine according to methods 500, 600, etc.) to a ride sharing network and receiving passenger additions to one or more flight plans, thereby transitioning potential flight plans to engaged flight plans. For example, the computing system (e.g., optimization/planning computing system 130, matching and fulfillment system 132, etc.) can expose the set of potential flight plans to the ride sharing network and receive the passenger additions to the one or more flight plans, thereby transitioning potential flight plans to engaged flight plans.

By way of example, after the computing system (e.g., optimization/planning computing system 130, matching and fulfillment system 132, etc.) generates the set of potential flight plans for the fleet and flight planning period, the set of potential flight plans can be exposed to the ride sharing network. In particular, a matching system (e.g., matching system(s) 134 of FIG. 1, etc.) of the ride sharing network can match one or more passengers of the network with a particular flight plan according to a matching process, thereby causing the flight plan to be engaged for operation. In some implementations, the matching system (e.g., matching system(s) 134 of FIG. 1, etc.) can perform passenger pooling in which multiple requests for service are collected from users over a period and the matching services collectively analyzes the requests to identify opportunities to pool passengers together. Although aspects of the present disclosure focus on providing aerial transportation services to human passengers, the systems and methods of the present disclosure are equally applicable to determining flight plans for aerial transportation services to non-human payloads, such as packages, prepared foods, pet transportation, and/or the like.

In some implementations, the set of potential flight plans can be exposed to the ride sharing network with minimal details. For example, the potential flight plans can be described by data indicative of a number of passengers and/or trips that can be serviced during a block of time at, between, and/or to a plurality of locations. The passengers of the ride sharing network can book a trip by booking an aerial transport over a block of time. The booked block of time can be utilized by the ride sharing network to match a passenger to a flight from the potential set of flights.

By way of example, passengers of the ride sharing network can book travel (e.g., generally, flight specific, etc.) for a block of time. The block of time can be descriptive of a time slot container and can be used as an input for generating an engaged flight plan. The computing system (e.g., matching and fulfillment system 132, etc.) can receive a plurality of requests, group the plurality of requests within one or more time slot containers, and wrap a flight (e.g., from the set of potential flights) around the time slot container. The passengers can be given a price estimate, but not be charged until after the performance of the flight. Before the performance of the flight, the passenger can be provided information such as an aircraft type assigned to perform the flight, a time slot associated with the flight, and/or any other information associated with the engaged flight.

In this manner, an engaged flight plan can be generated by adding passengers to a potential flight plan of the set of potential flight plans. Thus, an engaged flight plan can include a potential flight plan with one or more assigned passengers. For example, each engaged flight plan can be associated with one or more assigned passengers of the passengers associated with the ride sharing network. In addition, the engaged flight plan can include a scheduled take-off time, a scheduled landing time, and a buffer time period. The buffer time period can be indicative of a delay from the scheduled take-off time (e.g., an acceptable delay). The buffer time period can be determined based, at least in part, on the input data, the one or more constraints (e.g., weather, traffic, deviations, etc.), and/or the time period. For example, the engaged flight plan can form a user-centric flight schedule with an adjustable take-off time based, at least in part, on the assigned passengers associated with the engaged flight plan. This adjustable, user-centric, take-off time can be represented by the buffer time period.

More particularly, the engaged flight plan can include a buffer time period determined based on wholistic inputs centered around passenger convenience. By way of example, the computing system (e.g., matching and fulfillment system 132, etc.) can generate an engaged flight plan based, at least in part, on one or more assigned passengers (e.g., added by the ride sharing network). The computing system (e.g., matching and fulfillment system 132, etc.) can determine a buffer time period for the engaged flight plan based, at least in part, on the one or more assigned passengers of the engaged flight plan.

For example, each of the one or more assigned passengers can be associated with a multi-leg travel itinerary. The multi-leg travel itinerary can include, for example, multiple travel legs via one or more different modalities. For instance, one leg of the multi-leg travel itinerary can include the engaged flight plan. Additional travel legs can include ground transportation to an origin location of the engaged flight plan, another ground transportation from the destination location of the engaged flight plan, and/or one or more additional flight legs preceding and/or subsequent to the engaged flight plan.

In some implementations, the computing system (e.g., matching and fulfillment system 132, etc.) can determine the buffer time period based, at least in part, on the multi-leg travel itinerary for each of the one or more assigned passengers. For instance, the multi-leg travel itinerary can be associated with a total estimated travel time for an assigned passenger. In such a case, the buffer time period can be determined based, at least in part, on an aggregated delay time period to the multi-leg travel itinerary of each of the one or more assigned passengers as a result of delaying the engaged flight plan by one or more different periods of time. The buffer time period, for example, can be determined to ensure that the aggregated delay period is less than a threshold time (an hour, 30 minutes, 10 minutes, etc.). In some cases, the threshold time can include a time period less than the duration of an engaged flight. As one example for illustration purposes, the computing system (e.g., matching and fulfillment system 132, etc.) can predict a higher rate of traffic for ground transportation at a first time period after the engaged flight. In such a case, the computing system (e.g., matching and fulfillment system 132, etc.) can determine a buffer time period that is less than the first time period to prevent the affected passenger from being further delayed by foreseeable traffic.

In addition, or alternatively, the buffer time period can be determined based, at least in part, on a number of the one or more assigned passengers that will have a change to their multi-leg travel itinerary as a result of delaying the engaged flight plan by one or more different periods of time. For example, the buffer time period can be determined to avoid causing one or more assigned passengers to miss a subsequent flight.

At (408), the method 400 can include monitoring the adherence of the fleet of aircraft and/or passengers to the engaged flight plans. For example, the computing system (e.g., matching and fulfillment system 132, monitoring and mitigation system 136, etc.) can monitor adherence of the fleet of aircraft and/or passengers to the engaged flight plans.

More particularly, the computing system (e.g., matching and fulfillment system 132, monitoring and mitigation system 136, etc.) can continuously monitor the success/viability of each engaged flight plan. For example, the computing system (e.g., matching and fulfillment system 132, monitoring and mitigation system 136, etc.) can monitor real-time data such as aircraft location data (e.g., received from service provider computing device(s) 150, 160, 170, etc.), aircraft sensor data (e.g., from service provider computing device(s) 150, 160, 170, infrastructure and operations computing device(s) 190, etc.), passenger location data (e.g., with permission, received from a rider computing device(s) 140, service provider computing device(s) 150, 160, 170, etc.), weather data (e.g., from forecasting system 128, etc.), ground-based transportation data (e.g., received from service provider computing device(s) 150, 160, 170, etc.), and/or other forms of data to detect current or likely deviations of the fleet of aircraft and/or passengers from engaged flight plans. In particular, the computing system (e.g., matching and fulfillment system 132, monitoring and mitigation system 136, etc.) can monitor and evaluate the estimated times of arrival for some or all passengers versus planned times of arrival, the estimated times of arrival for some or all aircraft versus planned times of arrival, and/or other measures of success of flight plans.

In this manner, at (408), the computing system (e.g., matching and fulfillment system 132, monitoring and mitigation system 136, etc.) can continuously assess whether flights will successfully depart and/or arrive at their scheduled times, including tracking whether assigned passengers will be able to successfully arrive at the departing transportation node in sufficient time to physically progress through the transportation node and embark on the aircraft. In particular, in some implementations, the estimated arrival time can be for a passenger and can be based on a first leg of a multi-leg itinerary. For example, a user may use ground-based transportation (e.g., a ride shared car) to get to the transportation node and, as such, the computing system (e.g., matching and fulfillment system 132, monitoring and mitigation system 136, etc.) can track the user's progress along the ground-based transportation leg to assess whether the user will arrive in sufficient time to avoid delaying their associated flight (e.g., which may be the second leg of the multi-leg itinerary).

The computing system (e.g., matching and fulfillment system 132, monitoring and mitigation system 136, etc.) can track the user location, for example, by receiving location data associated with one or more of the one or more passengers. For example, the computing system (e.g., matching and fulfillment system 132, monitoring and mitigation system 136, etc.) can interact (e.g., via one or more service provider device(s) 150, 160, 170, etc.) with the ride sharing network to receive updates to a passenger's location. As an example, the computing system (e.g., matching and fulfillment system 132, monitoring and mitigation system 136, etc.) can receive passenger location data associated with a respective passenger from a ground vehicle device assigned to the respective passenger for providing ground transportation to the respective passenger before a respective engaged flight plan for the passenger. The location data can be received in real-time, periodically, during the course of travel from the passenger's origin location to the first transportation node. In addition, or alternatively, the location data can be received in response to a detected deviation from an original estimated time of arrival. For example, the location data for a passenger can be indicative of a delayed or earlier estimated time of arrival for a passenger. In some implementations, the location data can include traffic information, driver information, flight information, and/or any other information associated with a passenger's transportation to a first transportation node of the engaged flight.

At (410), the method 400 can include detecting one or more deviations of the fleet of aircraft and/or passengers from the engaged flight plans. For example, the computing system (e.g., matching and fulfillment system 132, monitoring and mitigation system 136, etc.) can detect the one or more deviations of the fleet of aircraft and/or passengers from the engaged flight plans. The computing system (e.g., matching and fulfillment system 132, monitoring and mitigation system 136, etc.) can perform real-time mitigation and replanning when a particular flight plan becomes significantly delayed or cancelled/unfulfilled. Typically, the computing system (e.g., matching and fulfillment system 132, monitoring and mitigation system 136, etc.) can attempt to delay replanning activities until it is believed with significant probability that an engaged flight plan will not be able to be successfully completed.

At (412), the method 400 can include adjusting the flight plans to account for the deviation(s). For example, the computing system (e.g., matching and fulfillment system 132, monitoring and mitigation system 136, etc.) can adjust the flight plans to account for the deviation(s). For instance, the computing system (e.g., matching and fulfillment system 132, monitoring and mitigation system 136, etc.) can perform real-time mitigation and replanning based, at least in part, on one or more deviations of the one or more passengers. For example, the computing system (e.g., matching and fulfillment system 132, monitoring and mitigation system 136, etc.) can reoptimize the set of potential flight plans and/or the one or more engaged flight plans based, at least in part, on minimizing inconveniences to passengers of the ride sharing network. By way of example, the computing system (e.g., matching and fulfillment system 132, monitoring and mitigation system 136, etc.) can determine a mitigation action (e.g., delay a flight, reassign one or more passengers to different engaged/potential flights, etc.) in response to one or more deviations of the fleet of aircraft and/or passengers. For each available mitigation action, the computing system (e.g., matching and fulfillment system 132, monitoring and mitigation system 136, etc.) can determine a number of passengers that will be impacted as a result of the mitigation action. By way of example, the computing system (e.g., matching and fulfillment system 132, monitoring and mitigation system 136, etc.) can determine a number of passengers that will miss their arrive by times as a result of the mitigation action, an aggregate time period that will be added to all the passengers' transportation services as a result of the mitigation action, and/or other metrics. In this manner, the computing system (e.g., matching and fulfillment system 132, monitoring and mitigation system 136, etc.) can adjust one or both of the engaged flight plans and/or the set of potential flight plans to account for the one or more deviations with minimal negatively impacting the convenience of passengers engaged in an on demand transportation service.

In some implementations, the mitigation process can include delaying a flight based on the buffer time period of an engaged flight plan. For example, the buffer time period can be indicative of a time period before and/or after a scheduled take-off that is allowable for the aircraft. For example, allowances can be made for accommodating a late and/or early passenger based, at least in part, on an understanding of the user (e.g., location thereof) and other pooled users associated with the engaged flight. For example, the buffer time period can be determined based on a group inconvenience factor and/or a trickle down impact of a delay take-off time. The computing system (e.g., matching and fulfillment system 132, monitoring and mitigation system 136, etc.) can determine that a deviation is due to a late assigned passenger for an engaged flight plan. The computing system (e.g., matching and fulfillment system 132, monitoring and mitigation system 136, etc.) can determine an estimated time of arrival for the late assigned passenger and determine an adjustment for the engaged flight plan based, at least in part, on the estimated time of arrival for the late assigned passenger and the buffer time period. The computing system (e.g., matching and fulfillment system 132, monitoring and mitigation system 136, etc.) can apply the adjustment to the engaged flight plan.

By way of example, in response to determining that the estimated time of arrival for the late assigned passenger is after the scheduled take-off time by a time period greater than the buffer time period, the computing system (e.g., matching and fulfillment system 132, monitoring and mitigation system 136, etc.) can add the late assigned passenger to one or more of the set of potential flight plans (and/or engaged flight plans with space for the late assigned passenger). In addition, or alternatively, in response to determining that the estimated time of arrival for the late passenger is after the scheduled take-off time and within the buffer time period, the computing system (e.g., matching and fulfillment system 132, monitoring and mitigation system 136, etc.) can delay the scheduled take-off time for the engaged flight plan to accommodate the late assigned passenger. In some implementations, the computing system (e.g., matching and fulfillment system 132, monitoring and mitigation system 136, etc.) can automatically transmit notifications to one or more of: the late assigned passenger (e.g., via a respective rider computing device 140), operations personnel (e.g., via infrastructure and operations computing devices 190), and/or aircraft/ground vehicle operators (e.g., via service provider computing devices 150, 160, 170).

In some implementations, the mitigation process can include manual inputs by human mitigation personnel. For example, the need to perform mitigation can be automatically detected and, as a result, the computing system (e.g., matching and fulfillment system 132, monitoring and mitigation system 136, etc.) can provide an alert and a mitigation user interface to a human mitigation personnel. For example, the mitigation user interface can include a graphical user interface that shows potential alternative flight plans for and/or changes to a flight plan that is currently subject to delay/cancellation. As one example, the human personnel can interact with the interface to adjust various parameters of one or more flight plans. For example, the human personnel can alter flight departure times, alter buffer times associated with physical passage of passengers through transportation nodes and/or vehicle embarkation/disembarkation, add or remove passengers from flights, move passengers between flights, change pilots, and/or other actions to manually alter the set of flight plans. In some implementations, any downstream effects on the flight plans from a manual change can be automatically computed and propagated through the set of flight plans.

In some implementations, the user interface can provide warnings or other indications of how certain mitigation activities or potential actions might affect other users of the system and/or violate certain of the initial input constraints. For example, if the mitigation personnel attempts to delay a not-yet-departed flight plan to wait for a delayed user, the user interface can inform the mitigation personnel that such action would impact 3 other travelers. The warnings/indications provided in the user interface can provide impact information according to various metrics including, for each available choice/action, a number of users that will be impacted as a result of the choice/action, a number of users that will miss their arrive by times as a result of the choice/action, an aggregate time period that will be added to all the users' transportation services as a result of the choice/action, and/or other metrics. Generally, preference can be given to mitigation strategies that have minimal impacts on other passengers. In addition, certain constraints (e.g., final aircraft destination at the end of the flight planning period) can be manually violated while other constraints (e.g., safety constraints such as maximum weight in the aircraft) cannot be manually violated.

In another example, human personnel can change one or more constraints and then rerun the flight planning process. For example, if extreme weather renders a certain subset of the transportation nodes unusable for a period of time, the human personnel can adjust the constraints to mark the subset of transportation nodes as unavailable for the period of time and then rerun the flight planning process. Thus, certain adjustments can be made directly to individual flight plans while other adjustments may require a system-wide readjustment or replanning.

In some implementations, the mitigation process can be automated (e.g., with the ability for manual overrides). As an example, the computing system (e.g., matching and fulfillment system 132, monitoring and mitigation system 136, etc.) can continuously generate contingency flight plans. For example, the contingency flight plans can be generated using a process as described above but taking into account potential or actual delays in certain flight plans. When it is detected that mitigation interventions should be performed, the computing system (e.g., matching and fulfillment system 132, monitoring and mitigation system 136, etc.) can automatically select the best available contingency flight plans and push the selected flight plans out to each aircraft and other system component. For example, automatic updates and alerts can be sent to passengers, aircraft providers, operations personnel, and/or other integrated systems. The contingency flight plans can be ranked based on various metrics including, for each potential set of updated flight plans, a number of passengers that will be impacted as a result of the choice/action, a number of passengers that will miss their arrive by times as a result of the choice/action, an aggregate time period that will be added to all the passengers' transportation services as a result of the choice/action, and/or other metrics. Alternatively, or additionally, the objective function(s) can be used to score the contingency flight plans and/or replan for some or all of the fleet of aircraft. Thus, in some instances, the dynamic contingency generation can be viewed as a continuous fleet-wide reoptimization of flight plans based on real-time conditions.

In some implementations, the mitigation process can be automated and implemented within the bounds of preapproval criteria established by the one or more aircraft operators. For example, the computing system (e.g., matching and fulfillment system 132, monitoring and mitigation system 136, etc.) can detect one or more deviations of the fleet of aircraft and/or the one or more passengers from the engaged flight plans. The computing system (e.g., matching and fulfillment system 132, monitoring and mitigation system 136, etc.) can determine an adjustment for at least one of the engaged flight plans and/or the set of potential flight plans to accommodate for the one or more deviations. The computing system (e.g., matching and fulfillment system 132, monitoring and mitigation system 136, etc.) can compare the adjustment to preapproval criteria for an operator of the at least one of the engaged flight plans or the set of potential flight plans. In response to determining that the adjustment achieves the preapproval criteria, the computing system (e.g., matching and fulfillment system 132, monitoring and mitigation system 136, etc.) can automatically adjust the at least one of the engaged flight plan and/or the set of potential flight plans. In response to determining that the adjustment does not achieve the preapproval criteria, the computing system (e.g., matching and fulfillment system 132, monitoring and mitigation system 136, etc.) can transmit data indicative of the adjustment to human mitigation personnel.

Additional Disclosure

The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

In particular, although FIGS. 4, 5, and 6 respectively depict steps performed in a particular order for purposes of illustration and discussion, the methods of the present disclosure are not limited to the particularly illustrated order or arrangement. The various steps of the methods 400, 500, and 600 can be omitted, rearranged, combined, and/or adapted in various ways without deviating from the scope of the present disclosure.

What is claimed is:

1. A method comprising:
accessing, by a flight planning system, a flight plan for an aircraft;
exposing, by the flight planning system over a communication network, the flight plan to a ride sharing network that facilitates ground transportation services;
accessing, by the flight planning system from the ride sharing network, passenger data indicating a passenger to be added to the flight plan;
accessing, by the flight planning system, location data from the ride sharing network, wherein the location data is determined by tracking the passenger added to the flight plan;
accessing, by the flight planning system from the ride sharing network, an estimated time of arrival for the passenger added to the flight plan, the estimated time of arrival being based on the location data;
determining, by the flight planning system, that the estimated time of arrival for the passenger is after a take-off time by a time period greater than a buffer time period;
computing, by the flight planning system, an estimated deviation from the flight plan based on the estimated time of arrival being after the take-off time by the time period greater than the buffer time period;
based on the estimated deviation from the flight plan, computing, by the flight planning system, an adjusted flight plan that comprises removing the passenger from data describing the flight plan; and
transmitting, by the flight planning system to a graphical user interface display of a computing device associated with the aircraft, a notification associated with the adjusted flight plan, wherein the notification is displayed on the graphical user interface display to indicate the passenger is removed from the flight plan.

2. The method of claim 1, wherein the passenger is associated with a multi-leg travel itinerary comprising at least: a leg comprising ground-based transportation provided via the ride sharing network and another leg comprising a flight associated with the flight plan.

3. The method of claim 2, wherein the estimated time of arrival is based on a progress of the passenger along the leg comprising the ground-based transportation.

4. The method of claim 1, wherein the location data is indicative of a location of a user device associated with the passenger.

5. The method of claim 1, wherein accessing the flight plan for the aircraft comprises:
accessing, by the flight planning system from the ride sharing network, ground-based transportation information indicative of at least one of a supply of ground transportation service providers or a demand for ground transportation services; and
computing, by the flight planning system, the flight plan based on the ground-based transportation information.

6. The method of claim 1, wherein a plurality of passengers are associated with the flight plan, each respective passenger of the plurality of passengers being associated with a respective multi-leg travel itinerary, wherein a leg of each of the respective multi-leg itinerary for the plurality of passengers comprises a flight associated with the flight plan.

7. The method of claim 6, comprising:
computing, by the flight planning system, the buffer time period for the flight associated with the flight plan based on the respective multi-leg travel itinerary for each of the plurality of passengers.

8. The method of claim 7, wherein the buffer time period is determined based on a number of the plurality of passengers that will have a change to their multi-leg travel itinerary as a result of delaying the take-off time by one or more different periods of time.

9. The method of claim 1, wherein the transmitting, by the flight planning system to the graphical user interface display of the computing device, the notification associated with the adjusted flight plan comprises transmitting the notification to at least one of: a computing device of the aircraft, a computing device of an operations personnel, or a computing device of an aircraft operator.

10. The method of claim 1, further comprising adding the passenger to the flight plan.

11. The method of claim 1, wherein exposing the flight plan comprises providing access to the flight plan through one or more application programming interfaces.

12. A computing system comprising:
one or more processors; and
one or more non-transitory computer-readable media storing instructions that are executable by the one or more processors to perform operations, the operations comprising:
accessing a flight plan for an aircraft;
exposing, over a communication network, the flight plan to a ride sharing network that facilitates ground transportation services;
accessing, from the ride sharing network, passenger data indicating a passenger to be added to the flight plan;
accessing, from the ride sharing network, location data, wherein the location data is determined by tracking the passenger added to the flight plan;
accessing, from the ride sharing network, an estimated time of arrival for the passenger added to the flight plan, the estimated time of arrival being based on the location data;
determining, by a flight planning system, that the estimated time of arrival for the passenger is after a take-off time by a time period greater than a buffer time period;
computing an estimated deviation from the flight plan based on the estimated time of arrival being after the take-off time by the time period greater than the buffer time period;
based on the estimated deviation from the flight plan, computing an adjusted flight plan that comprises removing the passenger from data describing the flight plan; and
transmitting, to a graphical user interface display of a computing device associated with the aircraft, a notification associated with the adjusted flight plan to indicate the passenger is removed from the flight plan.

13. The computing system of claim 12, wherein a plurality of passengers are associated with the flight plan, each respective passenger of the plurality of passengers being associated with a respective multi-leg travel itinerary, wherein a leg of each of the respective multi-leg itinerary for the plurality of passengers comprises a flight associated with the flight plan.

14. The computing system of claim 13, wherein the operations further comprise:
computing the buffer time period for the flight associated with the flight plan based on the respective multi-leg travel itinerary for each of the plurality of passengers.

15. The computing system of claim 14, wherein the buffer time period is determined based on a number of the plurality of passengers that will have a change to their multi-leg travel itinerary as a result of delaying the take-off time by one or more different periods of time.

16. The computing system of claim 12, wherein the estimated time of arrival is based on the location data indicative of a location of a user device associated with the passenger.

17. The computing system of claim 12, wherein the transmitting, to the graphical user interface display of the computing device associated with the aircraft, the notification associated with the adjusted flight plan comprises:
transmitting the notification associated with the adjusted flight plan to at least one of: a computing device of the aircraft, a computing device of an operations personnel, or a computing device of an aircraft operator.

18. One or more non-transitory computer-readable media storing instructions that are executable by one or more processors to perform operations, the operations comprising:
accessing a flight plan for an aircraft;
exposing, over a communication network, the flight plan to a ride sharing network that facilitates ground transportation services;
accessing, from the ride sharing network, passenger data indicating a passenger to be added to the flight plan;
accessing, from the ride sharing network, location data, wherein the location data is determined by tracking the passenger added to the flight plan;
accessing, from the ride sharing network, an estimated time of arrival for the passenger added to the flight plan, the estimated time of arrival being based on the location data;
determining, by a flight planning system, that the estimated time of arrival for the passenger is after a take-off time by a time period greater than a buffer time period;
computing an estimated deviation from the flight plan based on the estimated time of arrival being after the take-off time by the time period greater than the buffer time period;
based on the estimated deviation from the flight plan, computing an adjusted flight plan that comprises removing the passenger from data describing the flight plan; and
transmitting, to a graphical user interface display of a computing device, a notification associated with the adjusted flight plan to indicate the passenger is removed from the flight plan.

* * * * *